US012705405B2

(12) United States Patent
Schaffner et al.

(10) Patent No.: US 12,705,405 B2
(45) Date of Patent: Aug. 11, 2026

(54) READ-ONLY MEMORY (ROM) SECURITY

(71) Applicant: Google LLC, Mountain View, CA (US)

(72) Inventors: Michael Stefano Fritz Schaffner, Campbell, CA (US); Rupert James Swarbrick, Cambridge (GB); Timothy Jay Chen, Pleasanton, CA (US)

(73) Assignee: Google LLC, Mountain View, CA (US)

( * ) Notice: Subject to any disclaimer, the term of this patent is extended or adjusted under 35 U.S.C. 154(b) by 164 days.

(21) Appl. No.: 18/553,476

(22) PCT Filed: Apr. 1, 2022

(86) PCT No.: PCT/US2022/071514
§ 371 (c)(1),
(2) Date: Sep. 29, 2023

(87) PCT Pub. No.: WO2022/213128
PCT Pub. Date: Oct. 6, 2022

(65) Prior Publication Data
US 2024/0184932 A1 Jun. 6, 2024

Related U.S. Application Data

(60) Provisional application No. 63/170,430, filed on Apr. 2, 2021.

(51) Int. Cl.
*G06F 21/00* (2013.01)
*G06F 21/64* (2013.01)
(Continued)

(52) U.S. Cl.
CPC .............. *G06F 21/79* (2013.01); *G06F 21/64* (2013.01); *G06F 21/72* (2013.01)

(58) Field of Classification Search
CPC ........... G06F 21/79; G06F 21/64; G06F 21/72
See application file for complete search history.

(56) References Cited

U.S. PATENT DOCUMENTS 6,971,020 B1 11/2005 Liardet et al.
7,168,065 B1 1/2007 Naccache et al.
(Continued)

FOREIGN PATENT DOCUMENTS

CN 101582109 A 11/2009
CN 207424840 5/2018
(Continued)

OTHER PUBLICATIONS

"Foreign Office Action", IN Application No. 202347060235, Dec. 11, 2024, 6 pages.
(Continued)

*Primary Examiner* — Ghazal B Shehni
(74) *Attorney, Agent, or Firm* — Colby Nipper PLLC

(57) ABSTRACT

An apparatus with an integrated circuit (IC) chip can provide protection against attacks on a read-only memory (ROM), such as a boot ROM for security circuitry. An attacker can gain control of an IC by modifying ROM contents and/or redirecting ROM reads. To combat these attacks, example implementations store encrypted ROM data in the ROM array. A ROM controller is used to cryptographically tie the address of each ROM line to the corresponding encrypted ROM datum. To access the encrypted ROM datum, cryptographic circuitry decrypts the encrypted ROM datum using a key that is generated based on the corresponding ROM address. As part of an integrity checking procedure, a digest can be computed based on the encrypted ROM data. To further thwart would-be attacks, the ROM address can be adjusted (e.g., scrambled) before the controller uses the adjusted address to read encrypted data from the ROM array.

13 Claims, 16 Drawing Sheets

(51) Int. Cl.
*G06F 21/72* (2013.01)
*G06F 21/79* (2013.01)

(56) References Cited

U.S. PATENT DOCUMENTS

| | | | | |
|---|---|---|---|---|
| 9,230,112 | B1 | 1/2016 | Peterson et al. | |
| 10,333,708 | B1 | 6/2019 | Diamant et al. | |
| 11,409,668 | B2 | 8/2022 | Kim et al. | |
| 11,775,384 | B2 | 10/2023 | Kanno | |
| 2009/0196418 | A1 | 8/2009 | Tkacik et al. | |
| 2010/0115184 | A1 | 5/2010 | Chang | |
| 2012/0042376 | A1 | 2/2012 | Dolgunov et al. | |
| 2012/0179898 | A1 | 7/2012 | Betouin et al. | |
| 2012/0297111 | A1 | 11/2012 | Hsu et al. | |
| 2013/0145177 | A1 | 6/2013 | Cordella et al. | |
| 2013/0268740 | A1 | 10/2013 | Holt | |
| 2014/0173294 | A1 | 6/2014 | Buer | |
| 2015/0006914 | A1 | 1/2015 | Oshida | |
| 2015/0055778 | A1 | 2/2015 | Cox et al. | |
| 2015/0134976 | A1 | 5/2015 | Henry | |
| 2016/0232050 | A1 | 8/2016 | Sonnekalb et al. | |
| 2018/0063100 | A1 | 3/2018 | Peeters et al. | |
| 2018/0095985 | A1 | 4/2018 | Zhang | |
| 2019/0007201 | A1 | 1/2019 | Colombo et al. | |
| 2019/0042476 | A1* | 2/2019 | Chhabra | G06F 21/85 |
| 2019/0050602 | A1* | 2/2019 | Sela | G11C 7/24 |
| 2019/0095630 | A1 | 3/2019 | Wang et al. | |
| 2020/0036509 | A1 | 1/2020 | Seward, IV | |
| 2020/0184107 | A1 | 6/2020 | Troia et al. | |
| 2020/0394337 | A1* | 12/2020 | Marinet | G11C 29/38 |
| 2021/0182379 | A1 | 6/2021 | Sanchez | |
| 2021/0232396 | A1 | 7/2021 | Arsanto et al. | |
| 2021/0312055 | A1* | 10/2021 | Kloth | H04L 9/0866 |
| 2022/0058295 | A1 | 2/2022 | Boehm et al. | |
| 2022/0066657 | A1 | 3/2022 | Khayat et al. | |
| 2024/0193309 | A1 | 6/2024 | Wagner et al. | |
| 2024/0361923 | A1 | 10/2024 | Swarbrick et al. | |

FOREIGN PATENT DOCUMENTS

| | | | |
|---|---|---|---|
| CN | 109472172 | | 3/2019 |
| CN | 110659521 | A | 1/2020 |
| CN | 111737013 | | 10/2020 |
| CN | 112069551 | A | 12/2020 |
| EP | 0114522 | | 8/1984 |
| EP | 0908810 | | 4/1999 |
| JP | S59188897 | A | 10/1984 |
| JP | H03168831 | A | 7/1991 |
| JP | H11191079 | A | 7/1999 |
| JP | 2003108257 | A | 4/2003 |
| JP | 2004054885 | A | 2/2004 |
| JP | 2010021637 | A | 1/2010 |
| JP | 2010258630 | A | 11/2010 |
| JP | 2011010218 | A | 1/2011 |
| JP | 2016126746 | A | 7/2016 |
| JP | 2020524864 | A | 8/2020 |
| TW | 200629068 | | 8/2006 |
| TW | 201019337 | A | 5/2010 |
| TW | 201203092 | | 1/2012 |
| TW | 201638798 | A | 11/2016 |
| TW | 201820132 | | 6/2018 |
| TW | 202101224 | A | 1/2021 |
| WO | 2006027308 | A2 | 3/2006 |
| WO | 2015168211 | | 11/2015 |
| WO | 2022213128 | | 10/2022 |
| WO | 2022213129 | | 10/2022 |
| WO | 2022217229 | | 10/2022 |

OTHER PUBLICATIONS

"Foreign Office Action", TW Application No. 111112862, Aug. 26, 2024, 36 pages.
"Foreign Office Action", JP Application No. 2023-557161, Oct. 22, 2024, 10 pages.
"Foreign Office Action", JP Application No. 2023-557214, Oct. 22, 2024, 13 pages.
"Foreign Office Action", JP Application No. 2023-557159, Nov. 12, 2024, 11 pages.
"Foreign Office Action", TW Application No. 111112851, Jan. 10, 2023, 12 pages.
"Foreign Office Action", TW Application No. 111112851, Jun. 20, 2023, 13 pages.
"International Search Report and Written Opinion", Application No. PCT/US2022/071514, Jul. 18, 2022, 12 pages.
"International Search Report and Written Opinion", Application No. PCT/US2022/071516, Jul. 19, 2022, 11 pages.
"International Search Report and Written Opinion", Application No. PCT/US2022/071557, Oct. 25, 2022, 18 pages.
"Invitation to Pay Additional Fees and Partial Search Report", Application No. PCT/US2022/071557, Aug. 5, 2022, 9 pages.
"Foreign Office Action", TW Application No. 112140413, Nov. 8, 2023, 4 pages.
"International Preliminary Report on Patentability", Application No. PCT/US2022/071514, Oct. 3, 2023, 8 pages.
"International Preliminary Report on Patentability", Application No. PCT/US2022/071516, Oct. 3, 2023, 8 pages.
"International Preliminary Report on Patentability", Application No. PCT/US2022/071557, Oct. 10, 2023, 12 pages.
"Foreign Office Action", TW Application No. 111112851, Jan. 12, 2024, 6 pages.
"Foreign Office Action", TW Application No. 111112851, Jul. 15, 2025, 18 pages.
"Non-Final Office Action", U.S. Appl. No. 18/554,124, Oct. 1, 2025, 9 pages.
"Foreign Office Action", IN Application No. 202347059888, Apr. 2, 2025, 5 pages.
"Foreign Office Action", IN Application No. 202347060234, Apr. 2, 2025, 6 pages.
"Non-Final Office Action", U.S. Appl. No. 18/553,488, Jun. 12, 2025, 22 pages.
"Restriction Requirement", U.S. Appl. No. 18/554,124, May 14, 2025, 6 pages.
"Final Office Action", U.S. Appl. No. 18/553,488, Dec. 2, 2025, 19 pages.
"Foreign Office Action", EP Application No. 22719187.1, Feb. 20, 2026, 7 pages.
"Foreign Office Action", EP Application No. 22718039.5, Mar. 13, 2026, 6 pages.
"Final Office Action", U.S. Appl. No. 18/554,124, Mar. 26, 2026, 10 pages.
"Foreign Office Action", KR Application No. 10-2023-7031202, May 4, 2026, 17 pages.
"Foreign Office Action", KR Application No. 10-2023-7031346, May 14, 2026, 17 pages.

* cited by examiner

600
To: System Bus
Alerts
Interface
604
Register
606
To: Power Manager
To: Key Manager
To/From: Digest Computation Circuit
ROM Checker Circuit
616
622
624
610
634
Integrity Checker Circuit 502
602
632
Adj. Ckty.
504
620
Keystream Circuitry
608
628
630
DC
614
Manip. Ckty.
612
ROM Array 404
626
Zero Padder
618

ROM Array 404

Encrypted ROM Data 410

Encrypted ROM Datum 412-1

Encrypted ROM Datum 412-L

ROM Address 414

Key 804

Cryptographic Algorithm 806

ROM Line 802-1

ROM Line 802-L

READ-ONLY MEMORY (ROM) SECURITY

RELATED APPLICATION(S)

This application is a national stage entry of International Application No. PCT/US2022/071514, filed Apr. 1, 2022, which claims the benefit of U.S. Provisional Application No. 63/170,430, filed Apr. 2, 2021, the disclosures of which are incorporated herein by reference in their entirety.

BACKGROUND

Electronic devices play integral roles in manufacturing, communication, transportation, healthcare, commerce, social interaction, and entertainment. For example, electronic devices power the server farms that provide cloud-based, distributed computing functionality for commerce and communication. Electronic devices are also embedded in many different types of modern equipment, from medical devices to appliances and from vehicles to industrial tools. Personal electronic devices enable portable video viewing and convenient access to smart digital assistants. Additionally, one versatile electronic device—the smartphone—has practically become a necessity to have within arm's reach. With electronic devices becoming pervasive and crucial to many aspects of modern life, device security has become imperative.

Many people are familiar with malware, which is sometimes referred to generically as a "computer virus." Some malware is designed to gain unauthorized access to information stored by an electronic device or to otherwise compromise the electronic device. Several strategies can help keep a user's devices and information safe from security threats by countering certain types of malware. These strategies include employing and regularly updating a resilient operating system, engaging in safe computing practices, and installing an antimalware program. Unfortunately, these strategies cannot make an electronic device invulnerable to all malware attacks.

Further, electronic devices can also be vulnerable to other types of attacks besides those carried out by software-based malware. For example, the safe and reliable operation of electronic devices, as well as the security of information stored by such devices, can be jeopardized by physical attacks on hardware and by radio-frequency attacks against wireless communications. In other words, some forms of attack can circumvent or undermine the strategies listed above to enable a bad actor to compromise an electronic device and potentially gain access to any accounts that are used with the device.

Electronic devices include at least one integrated circuit (IC) that provides the intelligence to enable various functionalities. These functionalities facilitate commerce, streamline healthcare access, provide entertainment, support social media interactions, and enable other services as identified above. An electronic device may also store or otherwise utilize information that is to be safeguarded. To support these functionalities and facilitate safe operation, some electronic devices include hardware-based protection in the form of security circuitry that is part of an IC. Unfortunately, existing approaches to security circuitry are inadequate to combat the varied software, hardware, and wireless attacks that are being unleashed on electronic devices today.

SUMMARY

Certain electronic devices, like server computers and smartphones, are responsible for providing services to users. Users rely on these electronic devices to obtain critical services that are accessed using one or more accounts, like those for financial services, air travel, or official government documents. Because of the linkages between electronic devices and accounts, a compromised electronic device may permit undesired access to the services linked to an account or permit unauthorized access to the account itself. Further, to provide services that are associated with such accounts, these electronic devices may store account-related information that is to be safeguarded, such as financial data, usernames, passwords, and secret keys for encryption. Unfortunately, antimalware programs cannot block all avenues of attack against an electronic device. An antimalware program may not, for instance, provide protection against a direct physical attack that uses miniature probes to detect voltage levels on an integrated circuit (IC) chip. Consequently, it is beneficial to incorporate into an electronic device hardware-based measures that can identify, block, repel, or otherwise thwart attacks on the electronic device, including counteracting physical attacks.

An electronic device may therefore include security circuitry to counter attacks from bad actors. In some cases, the security circuitry detects inappropriate or suspicious activity and takes protective action. The security circuitry can be implemented in different manners. For example, computer engineers can fabricate security circuitry as a standalone IC chip or as part of another chip, such as a system-on-a-chip (SoC). In any case, the security circuitry can be part of a protected enclave, a trusted chip platform, a hardware-based root of trust (ROT) (e.g., silicon ROT), or a combination thereof. Regardless of how or where the security circuitry is incorporated into an electronic device, computer engineers may design security circuitry to counter many different types of attacks, as is described next.

Attacks on electronic devices can take the form of programs that observe screen images or monitor repetitive behavior to infer information, applications that attempt to read data from protected areas of memory, direct physical probing of circuitry, and so forth. Security circuitry performs multiple functions to combat one or more of these attacks. For example, security circuitry can protect encryption keys during use, while in transit, or in storage. To do so, dedicated memory and private data buses can be employed. Security circuitry can also generate high-quality pseudorandom numbers or operate a cryptographic engine in an area that is separate from applications that may operate as malware. Further, security circuitry may ensure that hardware is booted using the correct, untampered bootable basic input/output system (BIOS).

Security circuitry can therefore be responsible for implementing a diverse suite of functions to combat a wide variety of attacks on electronic devices. Existing approaches to security circuitry, however, employ hardware architectures that are designed on an ad hoc basis. Different circuit portions of the security circuitry may also be designed in relative isolation from one other. Consequently, circuit portions that are designed to combat various security threats may fail to interoperate as intended, leaving hardware less secure. Additionally, poor inter-component communication creates another avenue of attack for would-be bad actors. Further, this ad hoc approach makes the design and testing phases of security circuitry more arduous, lengthier, and more costly. This can lead to some security threats being ignored or inadequately addressed when the security architecture is developed. These ad hoc architectures therefore make protecting electronic devices from diverse and varied security threats more difficult.

This document, however, describes approaches that, in some examples, provide an adaptable and flexible framework or platform that can produce resilient and programmable security hardware to combat various forms of attacks on electronic devices. In some implementations for security circuitry, different types of circuits, or circuit portions that provide different security-related functionality, communicate using an expansive protocol that nonetheless produces certain and consistent signaling. The communication protocol enables circuits that provide different security-related functions to interact seamlessly in accordance with a specified design framework. The design framework and communication protocol produce comportable components such that even circuit components that are designed separately from one another are suitable to be consistently deployed together with stable, predictable interactions. As used herein, "comportable components" include those components that are designed to adhere to a common framework such that the components are suitable for use together. In some cases, comportability provides a degree of plug-and-play capability between two or more security-related components of an integrated circuit chip.

Security circuitry can include multiple peripheral devices in addition to a processor and an interconnect. Each peripheral device of multiple peripheral devices can perform some function that contributes to the safety or proper functioning of the security circuitry. Thus, each peripheral device can provide a core or supporting security-related function. The function, like controlling access to data or performing encryption operations, supports an overall purpose of the security circuitry. Such purposes may include providing features to enable secure computing by other circuitry and/or ICs of an electronic device. For the sake of predictability and interoperability, each peripheral device may be realized as a comportable component.

Generally, computing and other electronic devices are subject to attacks, including physical attacks, that can corrupt or steal data. A hardware root of trust (RoT) scheme can combat many attacks, including some physical ones. RoT silicon can be realized with an integrated circuit that provides security features. In some cases, a silicon ROT chip includes a read-only memory (ROM) that is subject to physical attack by a bad actor who may attempt to read or modify lines of the ROM. These physical attacks may be performed while ROM entries (e.g., ROM instruction lines), or ROM data generally, are being read out and/or are being executed.

A ROM can, however, be designed or built to resist attacks. Moreover, a ROM block or module can be implemented as a comportable component—e.g., a ROM peripheral device—of a security chip. To protect a ROM in a silicon ROT chip or other security circuitry, the ROM can be encrypted. This document further describes tying the ROM addresses and the ROM data together using encryption. For example, a ROM controller can generate a key for decrypting a ROM datum (e.g., an item of data stored in the ROM memory, such as some or all the data stored at a particular ROM address) using the corresponding ROM address. By cryptographically linking a respective ROM address to its associated ROM datum that is stored in a ROM array, fault attacks on the (e.g., relatively narrow) address bus for the ROM cannot be used to easily redirect reads to other ROM entries. These reads of the ROM array can pertain to executing code, retrieving data, or performing an integrity check on the ROM entries. This cryptographic linking of ROM content to the ROM addresses that access the content (e.g., addresses in the ROM memory where corresponding ones of the ROM data are stored) can protect the ROM even if the decryption key is known by an adversary.

To protect a ROM in a silicon ROT environment from being unknowingly modified, the ROM data can be associated with an expected digest (or "digest value") that is derived using a hashing algorithm and stored in the ROM. During bootup, the ROM can check if the stored expected digest value matches another digest value that is contemporaneously computed on the current ROM data. A potential vulnerability with this protection approach is that an attacker may attempt to hide a fault attack on the address bus by temporarily redirecting a ROM integrity checker to a different ROM entry with a same set of data bits.

First, to protect the integrity of a ROM having a ROM controller and a ROM array, the ROM data stored in the ROM array can be encrypted. As described above, the ROM data can also be encrypted in a manner that ties a respective ROM address to a respective ROM datum. Further, the ROM controller can adjust (e.g., scramble, such as by using a substitution and/or permutation algorithm, e.g., based on a key or cipher) an address to produce an adjusted address that is used to access the ROM array. This address adjustment can further reduce the risk that a modified ROM is undetected if an attacker attempts to redirect the address bus during a ROM integrity check.

To at least additionally reduce the risk of a redirection-based attack, this document describes selecting an encryption algorithm and/or an encryption key so as to reduce a quantity of duplicate instances of ROM datum stored in the ROM array. By iteratively changing the encryption algorithm and/or the encryption key and reviewing the resulting ROM entries, duplicate ROM entries may be completely avoided or omitted in some cases. This at least limits, and may eliminate, the potential effectiveness of a redirection attack that targets an alternative ROM entry during operation of a ROM integrity checker. Accordingly, a ROM array can store ROM entries that are unique from each other, and a ROM controller can safely apply a hashing algorithm to compute a digest value that correctly reflects a current content of the ROM.

BRIEF DESCRIPTION OF THE DRAWINGS

Apparatuses of and techniques for ROM security are described with reference to the following drawings. The same numbers are used throughout the drawings to reference like features and components.

FIG. 3-1 illustrates an example peripheral device including at least one interface to support comportability with other circuit components.

FIG. 3-2 illustrates an example approach to analyzing a peripheral device design to ensure comportable objectives are satisfied.

FIG. 3-3 illustrates an example peripheral device including a register interface and example communication signals.

DETAILED DESCRIPTION

Overview

Figure 1:
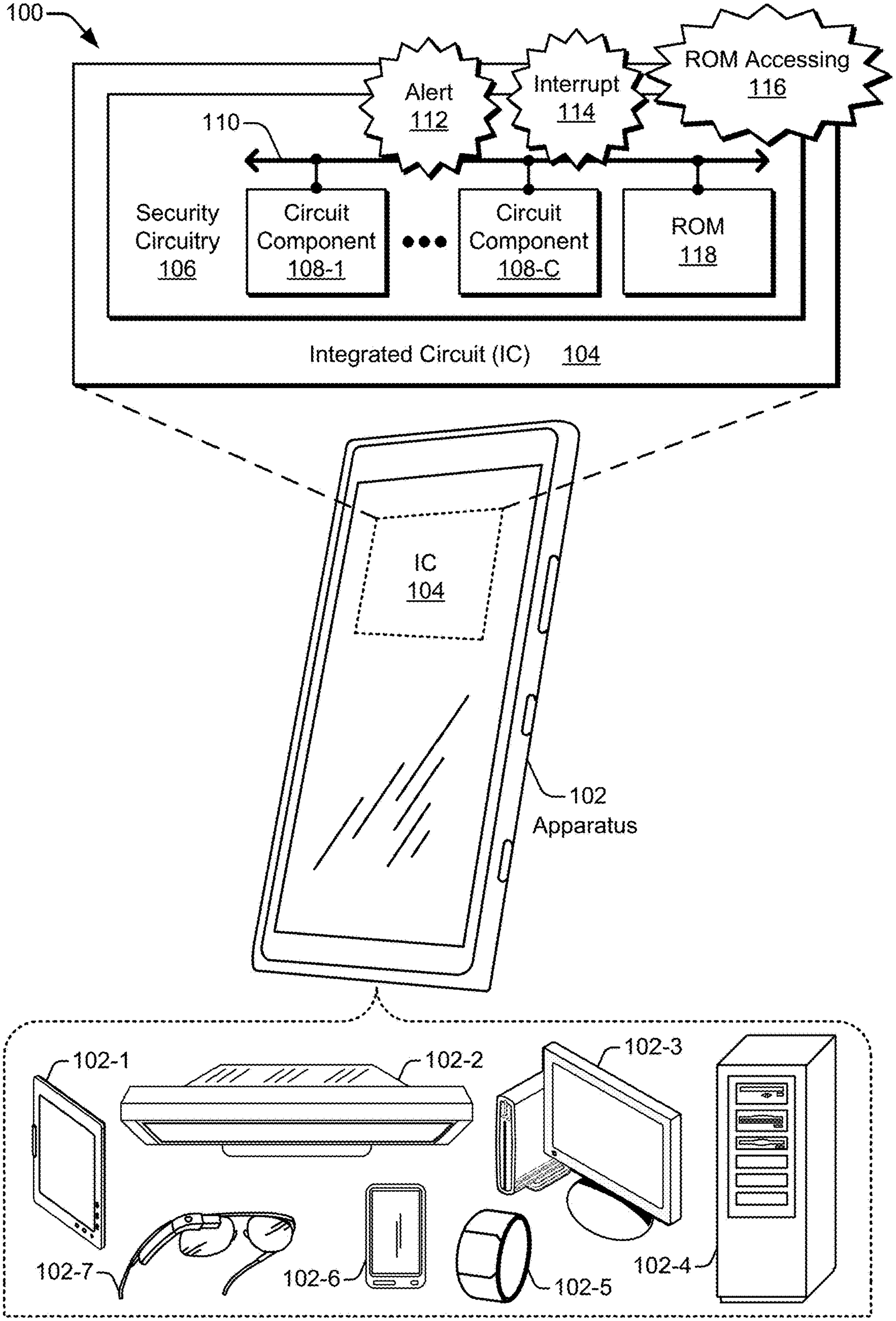
FIG. 1 illustrates an example apparatus with an integrated circuit (IC) that includes security circuitry in which ROM security can be implemented.

Electronic devices make important contributions to modern society, such as those related to communication, safety, and manufacturing. Each electronic device relies on an integrated circuit (IC) that has processing capabilities to provide some functionality. With the critical nature of so many of these functionalities, an electronic device may include an IC with security circuitry to provide protection. The security circuitry reduces the chances that information is inadvertently exposed or that some function is used in a harmful or otherwise unauthorized manner. Security circuitry can be realized in a multitude of forms, one of which involves the root of trust (RoT) paradigm.

With RoT silicon, a hardware-based mechanism keeps computing safe in terms of preventing inappropriate access to information, deterring unauthorized use of a device, and so forth. Silicon ROT principles can help ensure that hardware infrastructure and the software that executes on it both remain in their intended, trustworthy state. To do so, the silicon RoT can verify that critical system components boot securely using authorized and verifiable code. Thus, it can ensure that a server or another electronic device boots with the correct firmware and that the firmware has not been infected by low-level malware. Silicon ROT can provide additional or alternative security benefits. For example, it can provide a cryptographically unique machine identity: this unique identity enables an operator to verify that an electronic device is legitimate. Further, it can maintain encryption keys and other information in a tamper-resistant silo, which prevents, or at least deters, even those with physical access to a device from obtaining the information. RoT services that are anchored in hardware can also offer authoritative, tamper-evident audit records and other runtime security services.

Chip designers can incorporate silicon ROT technology into individual IC chips that focus on providing security functions. Alternatively, ROT silicon can be integrated with other circuitry, including in a central processing unit (CPU) chip or package, in a graphics processing unit (GPU) chip or card, in a system-on-a-chip (SoC), in a memory storage device, and so forth. Generally, security circuitry can operate in server motherboards, network cards, client devices (e.g., laptops and smartphones), consumer routers, internet-of-things (IOT) devices, and fixed and portable storage units, just to name a few examples. By anchoring the RoT in silicon, computing security is enhanced across hardware, firmware, and software levels regardless of application or electronic device. Silicon ROT also enhances security across different devices that are in communication with each other directly or via a network. Although some security and circuit design principles are described in this document using a silicon or hardware ROT environment, this is done by way of example only, for the described principles are applicable to security circuitry generally.

In today's computing environment, bad actors can attack electronic devices at a myriad of levels using a multitude of attack vectors. For example, an attack can be made using malware that is transmitted over the internet to attempt to obtain information that is stored in a laptop but that a user wishes to be safeguarded. Also, an attack may involve injecting malware into firmware that is used to boot an electronic device, like a Wi-FiR router or an IoT device, during transportation of the device or while the device operates in an unobserved location. As another example, a bad actor may steal an electronic device and have ample time to perpetrate direct physical attacks on the device. Such direct physical attacks can include severing wires, probing voltages, injecting faults with a laser, repeatedly running code to observe trends and infer information, and so forth.

Security circuitry can therefore be responsible for implementing a diverse suite of functions to combat a wide variety of attacks on electronic devices. Existing approaches to security circuitry, however, employ hardware architectures that are designed on an ad hoc basis. Different circuit portions of the security circuitry may also be designed in relative isolation from one other. Consequently, circuit portions that are designed to combat various security threats may fail to interoperate as intended, leaving hardware less secure. Additionally, poor inter-component communication creates another avenue of attack for would-be bad actors. Further, this ad hoc approach makes the design and testing phases of security circuitry more arduous, lengthier, and more costly. This can lead to some security threats being ignored or inadequately addressed when the security architecture is developed. These ad hoc architectures therefore make protecting electronic devices from diverse and varied security threats more difficult.

This document, however, describes approaches that provide an adaptable and flexible framework or platform that can produce resilient and programmable security hardware to combat various forms of attacks on electronic devices. In some implementations for security circuitry, different types of circuits, or circuit portions that provide different security-related functionality, communicate using an expansive protocol that nonetheless produces certain and consistent signaling. The communication protocol enables circuits that provide different security-related functions to interact seamlessly in accordance with a specified design framework.

The design framework and communication protocol produce "comportable" components such that even circuit components that are designed separately from one another are suitable to be consistently deployed together with stable, predictable interactions. For example, communications and other forms of interactions (e.g., the sharing of resources such as buses, interfaces, or memory) can be at least partially standardized to provide a measure of predictability and interoperability. As used herein, "comportable components" include those components that are designed to adhere to a common framework such that the components are suitable for use together. In some cases, comportability provides a degree of plug and play capability between two or more security-related components of an integrated circuit chip.

In some implementations, security circuitry includes multiple peripheral devices in addition to a "centralized" processor and an interconnect. Each peripheral device of multiple peripheral devices performs some function that contributes to the safety or proper functioning of the security circuitry. Thus, each peripheral device can provide a core security-related function or a supporting security-related function. The function, like controlling access to data or performing encryption operations, supports an overall purpose of the security circuitry, which includes providing features to enable secure computing by other circuitry and/or ICs of an electronic device. For the sake of predictability and interoperability, each peripheral device may be realized as a comportable component.

An example of a circuit component that can be implemented as a comportable component and/or as a peripheral device is a ROM block or module. The ROM block can include a ROM array and a ROM controller. The ROM array may include boot-level instructions that are used to initialize an electronic device from a restart or power-on scenario. To protect the ROM block, the data in the ROM array can be encrypted, and the ROM controller can provide gated access to the ROM.

Further, the ROM block can tie together the ROM addresses and the associated ROM data using encryption. Here, "tie" can be used to mean to "associate." In particular, the ROM block may associate a ROM address with a ROM datum of the ROM data by using the ROM address as a parameter in an algorithm for the encryption of the ROM datum. For instance, a mask ROM (e.g., a ROM that has a grid of word lines and bit lines: typically, the word lines provide an address input, and the ROM memory outputs data on the bit lines) can be scrambled using a cipher, such as a PRINCE cipher. A respective ROM address can be used to scramble an associated respective ROM datum in any of multiple manners to link the address and the datum together. For example, the respective address can be used to decrypt the respective ROM datum. In some implementations, an unscrambled ROM address is used to produce at least one key, such as a keystream value, that is applied to a version of the corresponding ROM datum to produce a decrypted ROM datum. A block cipher like PRINCE can be employed, for example, in "counter (CTR) mode." Each ROM datum, such as a ROM entry or line, can include bits corresponding to the ROM (for example, ROM bits which encode user data or program instructions defining a process performed by the security circuitry, e.g., ROM bits defining algorithms) and bits corresponding to an error-correction code (ECC) value for the ROM bits of that datum.

Thus, this "encryption" of the ROM can be used to tie the ROM addresses and ROM data together by, for instance, using a respective ROM address as part of a decryption procedure for the respective ROM datum. This address-based encryption approach can ensure that fault attacks on the address bus cannot easily be used to redirect reads of a ROM array. By linking the ROM address and data together cryptographically, attacks that would redirect normal ROM accesses (e.g., thereby allowing an attacker to skip a fetched instruction in the boot code by turning it into a no operation (NOP)) can be thwarted. This protects operations by "external circuitry" (e.g., the main processor) that are requesting ROM data.

Scrambling the ROM also makes it more difficult for an attacker that wishes to alter the stored ROM code to suborn the device. For example, assume an attacker wishes to make a 1-bit change on an original, unencrypted ROM datum. This 1-bit change may normally be able to alter an instruction while still avoiding what would otherwise cause an integrity check to fail. With encrypted (e.g., scrambled) ROM data, on the other hand, such a change to an encrypted ROM datum may take an expected 19 bits (e.g., about half a 39-bit word) if the attacker is to modify the scrambled data. Thus, scrambling the mask ROM provides resilience against edits to the mask ROM and makes fault injection attacks at the boundaries of the ROM macro more difficult.

In example implementations. ROM data of a ROM block of security circuitry is encrypted. The encryption is used to tie together ROM addresses and associated ROM data. The ROM addresses and/or the associated ROM data can be scrambled. In some cases, the ROM address is used to unscramble the ROM data. The ROM data can be jointly scrambled with corresponding security values (e.g., ECC bits). In such cases, per-ROM-line security values can be used and stored together as the ROM line. To use the ROM address to unscramble the ROM data, the ROM address is used to generate a key to unscramble the associated ROM data. An unscrambled ROM address can also be adjusted or converted to a scrambled ROM address for reading entries of the ROM to further complicate and frustrate an attacker's efforts to modify the ROM and cause the device to boot with the modified ROM.

In other example implementations, a ROM block includes a ROM array and a ROM controller, which has a ROM checker circuit to verify the integrity of the ROM data. After making changes to the ROM array (e.g., a mask ROM), an attacker could attempt to conceal such changes by faulting or controlling communication between the ROM checker and the ROM array at startup. For example, the attacker may attempt to manipulate the data bus between the ROM checker circuit and the ROM array to hide changes to the ROM data. Similarly, an attacker may attempt to control the low order bits on the address bus, thereby subverting the ROM check by redirecting ROM accesses to skip modified words and point at unmodified copies.

These potential attacks can be at least partially frustrated by scrambling the ROM with a fixed key and running the hash over the scrambled data for the integrity check. Thus, attacks on the data bus are made more difficult by the diffusion properties of the scrambling scheme. For instance, to make a single bit change to the unscrambled data, an attacker would need to change many bits in the ROM array and then control those same bits on the data bus to hide the change that was made. Also, attacks on the address bus can be defeated by how the scrambling incorporates the address into the data scrambling scheme.

In additional example implementations, the ROM data is encrypted, and a ROM integrity checker operates on the encrypted ROM data. A ROM integrity checker circuit can verify that ROM data has not been altered at each boot-up or upon reset. The ROM integrity checker circuit can operate line-by-line. For example, the integrity checker circuit can cause a hashing algorithm to be applied to each line of the ROM while the ROM datum is still encrypted to compute a digest value. As described below: an expected digest value, which can be retrieved from the ROM, may be compared to the computed digest value after the encrypted ROM data has been fed to a circuit that is performing the hashing algorithm. The integrity checker circuit generates an alarm if the digest values do not match.

A ROM block or module can include a ROM array and a ROM controller. Generally, the contents of the ROM array, such as a mask ROM, can be scrambled as part of a suite of security strategies. At boot time, the ROM controller reads from the ROM array and sends the extracted scrambled contents to at least one digest checking module, such as a digest computation circuit that can apply a hashing algorithm. This digest computation circuit computes a digest of the contents using a hashing algorithm, such as the Secure Hash Algorithm 3 (SHA-3). The digest can also be computed using a customizable arbitrary-message-length version of SHA3 such as cSHAKE, which allows the circuitry to prefix the ROM data with a ROM-checker-specific function string in order to make the hashing function unique for a given application. The ROM data lines may not be aligned with the block size of the digest computation circuit, in which case the lines can be padded to the block length (e.g., with zeroes). The ROM controller can compare the digest obtained from the digest computation circuit with an expected digest to gate access to the ROM array. The ROM array may store the expected digest in one or more ROM address locations. The ROM controller can also provide the computed digest value to circuitry outside of the ROM, such as a host processor. The ROM controller may, for instance, expose the computed digest value via an interface register of the ROM that is accessible by other components. This enables one or more other components to verify that the ROM data has not been tampered with.

In example implementations, a fixed scrambling key may be selected to ensure that at least most, and in some cases all, ROM lines are distinct or different from each other. This means that a fault attack on the address bus cannot hide an alteration by temporarily redirecting the ROM controller, which communicates with the digest computation circuit, to a different line that stores the same ROM instruction.

Further, hashing scrambled data is more fault-resistant than hashing the unscrambled data. An attacker that wants to make a small alteration to the unscrambled ROM data must make a relatively large alteration to the scrambled ROM data. Because the hash is computed over the scrambled data, the attacker would need to fault or otherwise control many bits to hide the change. Thus, taken together, the encryption of the ROM data and the selection of the cipher key can render attacks on the ROM data itself and on the address bus far less likely to be successful.

In other example implementations, relative to producing at least one digest for multiple lines of a ROM, a process can entail selecting an encryption algorithm and/or an encryption key that reduces duplicate instruction lines as stored in the ROM. Further, an encryption algorithm and/or an encryption key can be selected that eliminates duplicate stored instruction lines. Thus, a scrambling algorithm and/or a scrambling key can be selected based on the contents of the ROM data to at least increase, if not maximize, variability of the resulting encrypted bits stored in the ROM array. This variability (e.g., uniqueness) makes it difficult, if not impossible, for an attacker to redirect an integrity checker from one ROM entry that is supposed to be checked to another ROM entry with the same word because few if any entries have the same stored ROM value. Using these techniques, a hashing algorithm can be applied to the scrambled data of a ROM. In other words, the at least one digest of the stored ROM data can be computed using the scrambled lines of the ROM data instead of unscrambled lines to increase the variability of the values on which the hashing algorithm operates.

In these manners, security circuitry can be incorporated into a silicon ROT chip and/or an SoC. Such security circuitry includes multiple peripheral devices, including a ROM block. Although some aspects of ROM security are described in a security circuitry environment and/or in the context of comportable design, the disclosed ROM security concepts are applicable to other circuit environments and other design paradigms.

Figure 2:
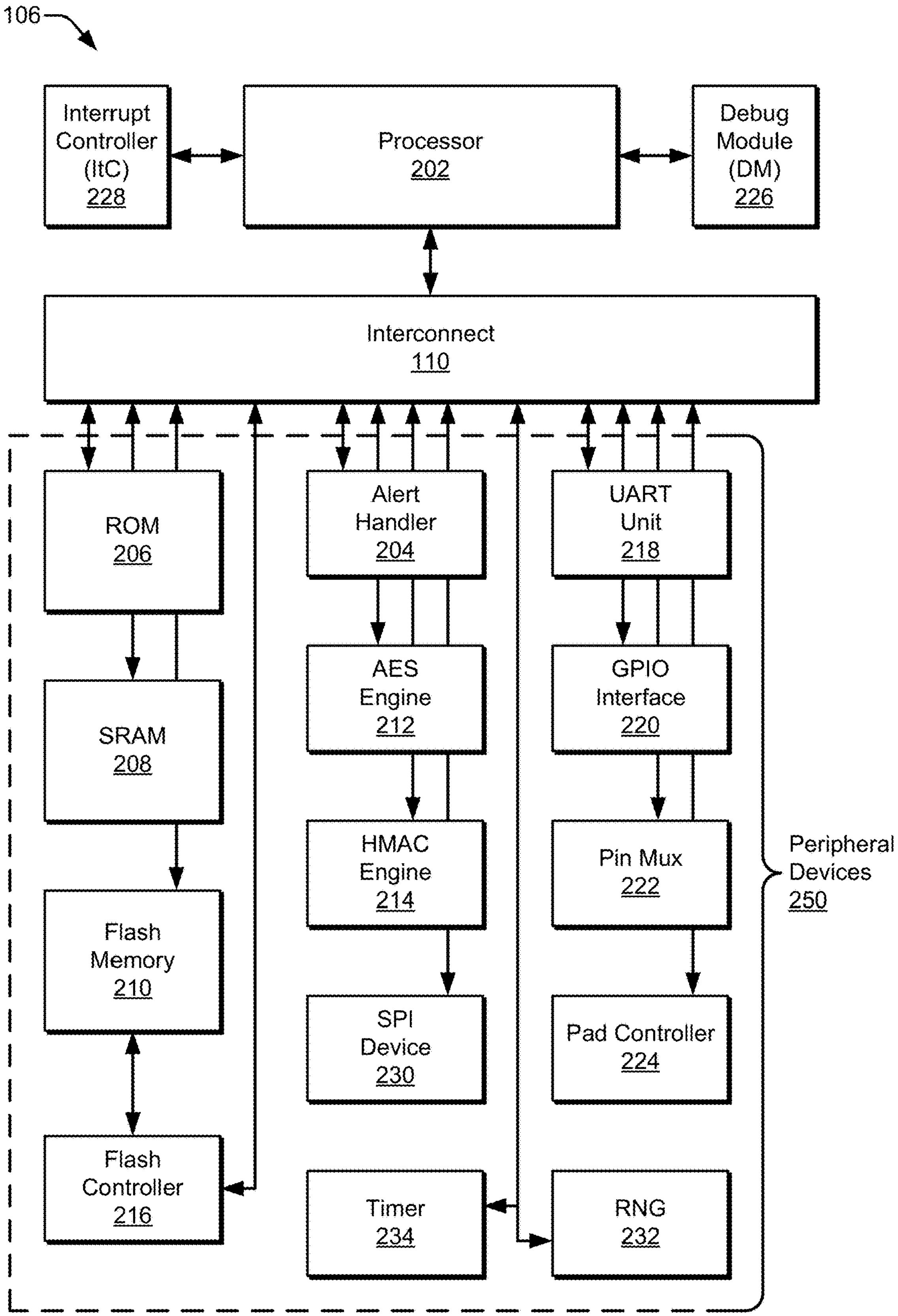
FIG. 2 illustrates example security circuitry that includes multiple circuit components, including multiple example peripheral devices that can be implemented to be comportable, such as a ROM block.

This document first describes security environment examples with reference to FIGS. 1 and 2. Examples of peripheral device interfaces and design code analyses are described next with reference to FIGS. 3-1 to 3-3. This document then describes aspects and implementations for ROM security with reference to FIGS. 4 to 13. An example electronic device is described with reference to FIG. 14. Each of the environments, aspects, and implementations described herein may be used individually or in any combination.

Thus, example implementations in various levels of detail are discussed below with reference to the associated figures. The discussion below first sets forth an example operating environment and then describes example hardware, schemes, and techniques. Example methods are described thereafter with reference to flow charts or diagrams. Finally, an example computing device is described.

Example Operating Environment for ROM Security

FIG. 1 illustrates, at 100 generally, an example apparatus 102 with an integrated circuit 104 (IC 104) that includes security circuitry 106. The apparatus 102, the integrated circuit 104, and/or the security circuitry 106 can implement ROM security as described herein. In this example, the apparatus 102 is depicted as a smartphone. The apparatus 102 may, however, be implemented as any suitable computing or electronic device.

Examples of the apparatus 102 include a mobile electronic device or mobile device, mobile communication device, modem, cellular or mobile phone, mobile station, gaming device, navigation device, media or entertainment device (e.g., a media streamer or gaming controller), laptop computer, desktop computer, tablet computer, smart appliance, vehicle-based electronic system, wearable computing device (e.g., clothing, watch, or reality-altering glasses), Internet of Things (IoTs) device, sensor, stock management device, electronic portion of a machine or piece of equipment (e.g., vehicle or robot), memory storage device (e.g., a solid-state drive (SSD)), server computer or portion thereof (e.g., a server blade or rack or another part of a datacenter), and the like. Illustrated examples of the apparatus 102 include a tablet device 102-1, a smart television 102-2, a desktop computer 102-3, a server computer 102-4, a smartwatch 102-5, a smartphone (or document reader) 102-6, and intelligent glasses 102-7.

In example implementations, the apparatus 102 includes at least one integrated circuit 104. The integrated circuit 104 can be mounted on a module, card, or printed circuit board (PCB) (not shown). Examples of a PCB include a flexible PCB, a rigid PCB, a single or multi-layered PCB, a surface-mounted or through-hole PCB, combinations thereof, and so forth. Each integrated circuit 104 can be realized as a general-purpose processor, a system-on-a-chip (SoC), a security-oriented IC (e.g., a RoT IC chip), a memory chip, a communications IC (e.g., a modem or radio-frequency IC), a graphics processor, an artificial intelligence (AI) accelerator, combinations thereof, and so forth. The integrated circuit 104 can be packaged alone or together with other IC chips.

As shown, the integrated circuit 104 includes security circuitry 106. The security circuitry 106 can include a variety of parts, including multiple circuit components 108-1 . . . 108-C, where (represents a positive integer, and an interconnect 110. Examples of circuit components 108, in addition to the interconnect 110, include a processor and multiple peripheral devices. These are depicted in FIG. 2 and described below. Although not explicitly shown in FIG. 1, the integrated circuit 104 may include other portions besides the security circuitry 106. While the multiple circuit components 108-1 . . . 108-C and the interconnect 110 may be integrated together on a single IC as shown, the components may alternatively be distributed across two or more ICs. The security circuitry 106 can be realized as, for example, a protected enclave, a trusted chip platform, a hardware-based root of trust (RoT) chip (e.g., a silicon ROT), and so forth. Regardless of how or where the security circuitry 106 is incorporated into an electronic device, the security circuitry 106 may counter many different types of attacks.

In example operations, once an attack—or a potential attack—or an anomalous occurrence is detected, an alert 112 or an interrupt 114 is generated by some component. For example, a circuit component 108 can generate an alert 112 and can transmit the alert 112 to an alert handler, which is described below. Additionally or alternatively, another circuit component 108 can generate an interrupt 114 for handling by the processor. The alert 112, the interrupt 114, and other signals are communicated between two or more components 108 in accordance with a common framework for interactions between the processor and/or peripheral devices of the security circuitry 106. The common framework can specify interfaces at each peripheral device and signaling to promote interoperability and use of consistent communication protocols across multiple peripheral devices. Thus, while some aspects of comportability are presented in terms of security circuitry, peripheral device comportability can also be employed with other types of circuitry. Example frameworks, as well as example communication interfaces and interface specifications, are described below with reference to FIGS. 3-1 to 3-3.

In some implementations, a circuit component 108 is realized as a ROM 118 or ROM block 118. The ROM 118 may be incorporated into the security circuitry 106 as a peripheral device, as a comportable component, a combination thereof, and so forth. The security circuitry 106, for instance, can access the ROM 118 as part of a restart to initialize the security circuitry 106 or the IC 104. The ROM 118 can be accessed for other purposes besides or instead of start-up operations. This ROM accessing 116 can be gated by the ROM 118 as part of a security paradigm that is described herein in conjunction with an integrity check of the ROM data. The ROM accessing 116 can also be protected by tying the ROM data to ROM addresses used to access the ROM data of the ROM 118. These and other aspects of ROM security are described below with reference to FIGS. 4 to 13. With reference to FIG. 2, however, example architectures of the security circuitry 106 are described next.

FIG. 2 illustrates example security circuitry 106 that includes multiple circuit components, including multiple example peripheral devices 250 that can be implemented to be comportable. As shown, the security circuitry 106 includes a processor 202 that is coupled to an interconnect 110. The interconnect 110 can be realized using, for example, a bus, a switching fabric, or a bus network that enables the various circuit components to communicate. The multiple circuit components 108-1 . . . 108-C (of FIG. 1) can include, besides the interconnect 110 and/or the processor 202, multiple memories and multiple peripheral devices. Each of the processor 202, the multiple memories, and the multiple other peripheral devices 250 is directly or indirectly coupled to the interconnect 110. As described herein, the ROM 118 (e.g., of FIGS. 1 and 4 et seq.) may correspond to the ROM 206 of FIG. 2.

In example implementations, the multiple memories can include a read-only memory 206 (ROM 206), a static random-access memory 208 (SRAM 208), and a flash memory 210. The multiple peripheral devices 250 can include an alert handler 204, an advanced encryption standard (AES) engine 212 (AES engine 212), a hash-based message authentication code (HMAC) engine 214 (HMAC engine 214), a serial peripheral interface (SPI) device 230 (SPI device 230), and a flash controller 216. The multiple peripheral devices 250 can also include a universal asynchronous receiver/transmitter (UART) unit 218 (UART unit 218), a general-purpose input/output (GPIO) interface 220 (GPIO interface 220), a pin multiplexer 222 (pin mux 222), and a pad controller 224. The multiple peripheral devices 250 can further include a random number generator 232 (RNG 232) and a timer 234. Additionally, the peripheral devices 250 can include any of the memories, as shown in FIG. 2. Although certain examples of memories and other peripheral devices 250 are depicted in FIG. 2 or described herein, a given implementation of the security circuitry 106 may include more, fewer, and/or different instances of processors, controllers, memories, modules, or peripheral devices, including duplicates thereof.

The illustrated circuit components can be operated synchronously based on one or more clock signals. Although not shown in FIG. 2, the security circuitry 106 may include at least one clock generator to generate the clock signals or may include reset circuitry to reset one or more individual components independently of each other, multiple components jointly, or an entire IC chip. Alternatively, the security circuitry 106 may receive at least one clock signal or a reset signal from a source that is external to the security circuitry 106, which source may or may not be on a separate chip. One or more separate peripheral devices 250 may operate in respective individual clock domains. For instance, input/output (I/O) peripheral devices may be synchronized to a clock that is local to a respective I/O device or channel. Peripheral devices in different clock domains may operate or communicate asynchronously with respect to one another.

Example implementations of the illustrated components are described below. The processor 202 may be realized as a "main," "central," or "core" processor for the security circuitry 106. The processor 202 may, by way of example only, be implemented with a 32-bit, in-order reduced instruction set computing (RISC) core with a multi-stage pipeline. With, e.g., the RISC-V instruction set, the processor may implement the M (machine) and U (user) modes. Activating a reset pin (not shown) (e.g., through de-assertion of an active-low reset pin) causes the processor 202 to exit reset and begin executing code at its reset vector. The reset vector may begin in the ROM 206, which validates code in the embedded flash (e-flash) before jumping to it. In other words, the code is expected to have been instantiated into the e-flash before the reset is released. In some cases, resets throughout the security circuitry 106 can be made asynchronous active low as per a comportability specification to support interoperability among the various circuit components. A reset may be generated by the alert handler 204 as a security countermeasure: by a watchdog timer: and so forth. Reset signals may also be sent to other circuit components, such as one of the memories or one of the other peripheral devices 250.

Coupled to the processor 202 are a debug module 226 (DM 226) and an interrupt controller 228 (ItC 228), either of which may also be made comportable. The debug module 226 provides debug-access to the processor 202. By interfacing with certain pins of the IC, logic in the debug module 226 allows the processor 202 to enter a debug mode and provides an ability to inject code into the device (e.g., by emulating an instruction) or into a memory. The interrupt controller 228 may be disposed proximate to the processor 202. The interrupt controller 228 can accept a vector of interrupt sources from within the security circuitry 106. The interrupt controller 228 can also assign leveling and priority to the interrupts before forwarding them to the processor 202 handling.

The processor 202 can provide any desired level of performance or include any internal circuit components. For example, the processor 202 can include at least one arithmetic logic unit (ALU) (e.g., including an "additional" ALU to calculate branch targets to remove a cycle of latency on taken conditional branches) and multiple pipeline stages. With multiple pipeline stages, a pipeline can perform register writeback to reduce a cycle of latency from loads and stores and prevent a pipeline stall where a response to a load or store is available the cycle after the request. The processor 202 can implement a single-cycle multiplier or produce an imprecise exception on an error response to a store, which allows the processor to continue executing past a store without waiting for the response. Although not depicted, the processor 202 specifically, or the security circuitry 106 generally, can include an instruction cache to provide single-cycle access times for instructions.

In the illustrated example, the security circuitry 106 includes three memory address spaces for instructions and data. The ROM 206 is the target for the processor 202 after release of a reset. The ROM 206 contains hard-coded instructions to perform a subset of platform checking before checking the next stage of code. The next stage of code—e.g., a boot loader stored in e-flash memory—can be the first piece of code that is not hard-coded into the silicon of the device. This next stage of code is, therefore, signature-checked for integrity to increase security. The ROM 206 can execute this signature check by implementing any of many algorithms, such as a Rivest-Shamir-Adleman (RSA)-check algorithm or an Elliptic Curve Digital Signature Algorithm (ECDSA), on the full contents of the boot loader.

The flash memory 210 can be implemented as embedded flash (e-flash) memory for code storage. This e-flash can house the boot loader mentioned above, as well as an operating system and applications that layer on top. The SPI device 230 can be used to bulk-load the e-flash memory. The debug module 226 may also be used for code loading. The SRAM 208 can be operated as a scratch pad SRAM that is available for data storage by the processor 202 (e.g., for stack and heap information). The SRAM 208 can also store code.

The security circuitry 106 can include a suite of "peripherals" or "peripheral devices." These peripheral devices 250 may be subservient execution units that are coupled to the processor 202 via the interconnect 110. Each of these peripheral devices 250 can follow an interface framework that ensures comportability with each other and with the processor 202. A comportability scheme can specify how the processor 202 communicates with a given peripheral device (e.g., using the interconnect 110), how a peripheral device communicates with the chip I/O (e.g., via a fixed or multiplexable I/O), how a peripheral device communicates with the processor 202 (e.g., using interrupts), how a peripheral device communicates security events (e.g., using alert indications) to other circuit components, like the alert handler 204; how a peripheral device communicates with other peripheral devices (e.g., via at least one register, synchronously, or asynchronously); or combinations thereof. The depicted peripheral devices 250 can comprise peripheral devices relative to the alert-related functionality provided by the alert handler 204, relative to the processor 202, relative to one or more of the memories, relative to a chip I/O, and so forth. Thus, the memories can also comprise peripheral devices 250 relative to each other or the other depicted circuit components.

Circuit or chip I/O peripherals include the pin mux 222 and the pad controller 224. The pin mux 222 provides signaling routes between at least a portion of the peripheral devices 250 and available multiplexable I/O nodes of the security circuitry 106 (e.g., pins of the chip in which the various components are integrated or an interface to other portions of an SoC). The pad controller 224 manages control or pad attributes like drive strength, technology, pull up versus pull down, and the like of each of the circuits' (e.g., the chip's) external I/O. The pin mux 222 and the pad controller 224 are themselves peripheral devices on the interconnect 110. Accordingly, each may have or may otherwise be associated with at least one collection of registers that provide software configurability.

The UART unit 218 can implement UART features, such as single-lane duplex UART functionality. The outputs and inputs thereof can be configured to connect to any circuit I/O via the pin mux 222. The GPIO interface 220 creates G bits of bidirectional communication to external circuitry via the pin mux 222, where G is a positive integer like 16, 32, or 64. Regarding memory I/O, the SPI device 230 can implement a firmware mode. Here, the firmware mode can enable a feature that provides the ability for external drivers to send firmware upgrade code into a bank of the flash memory 210 for in-field firmware updates. The firmware mode can include addressing of the memories using SPI transactions. Although not depicted, the security circuitry 106 can include an inter-integrated circuit (I2C) host to enable command of I2C devices. This command of I2C devices may include standard, full, and fast modes.

Several "core security" peripherals are also depicted, including the encryption engines and the alert handler 204. The AES engine 212 can provide symmetric encryption and decryption using one or more protocols and varying key sizes, like 128*b*, 192*b*, or 256*b*. The component can select encryption or decryption of data that arrives in, e.g., 16-byte quantities to be encrypted or decrypted using different block cipher modes of operation. The AES engine 212 can support electronic codebook (ECB) mode, cipher block chaining (CBC) mode, cipher feedback (CFB) mode, output feedback (OFB) mode, counter (CTR) mode, and the like. Data transfer can be made processor-available, e.g., key and data material may be passed into the cryptographic engine via register writes. Alternatively, private channels for the transfer of key and data material may be included to reduce exposure from potentially untrusted processor activity.

The HMAC engine 214 may utilize, for instance, a secure hash algorithm (SHA) SHA-256 as a hashing algorithm. SHA-256 is a member of the SHA-2 family of hashing algorithms in which the digest (or hash output) is of 256 b length, regardless of the data size of the input to be hashed.

The data is sent into the HMAC peripheral device after declaring the beginning of a hash request. This zeroes out the internal state to initial conditions, e.g., 32*b* at a time. Once the data has been sent by a component client, the client can indicate the completion of the hash request (with optional partial-word final write). In accordance with an example portability interface scheme, the HMAC engine 214 produces the hash result and makes it available for register read by the requesting client. The data transfer may be made processor-available or may be made private to reduce exposure to potentially untrusted processor activity:

HMAC is a message authentication protocol layered on top of a hashing function (e.g., SHA-256), and HMAC mixes in a secret key for cryptographic purposes. HMAC is a particular application of appending the secret key in a prescribed manner, such as twice, around the hashing (via SHA-256) of the message. To provide this functionality, a 256 b key may be programmed into the circuit component before the message hash begins. The timing of authentication completion can vary and may be longer in latency than using native SHA-256. Here again, the hashing information or the secret key may be made processor-available for convenience or processing efficiency or may be rendered private in some manner for increased security.

The alert handler 204 is responsible for processing and responding to alerts, including ones provided from other peripheral devices 250. The alerts can be considered security-sensitive interrupts that are to be handled in a timely manner to respond to a perceived security threat. Unlike "standard" interrupts, alerts are not handled solely by software executing on the processor 202. Alerts can trigger a first-stage request to be handled by software as a "regular" interrupt. If, however, the software is not able to respond and properly remedy the alert-triggered interrupt, then the alert handler 204 triggers a second-stage response. The second-stage response can include enacting a security countermeasure, including terminating a process, erasing or otherwise deleting data, withdrawing power from a circuit portion, or resetting an IC chip or portion thereof. This ensures that the underlying issue—the perceived security threat—is addressed even if the processor 202 is busy, wedged, or also under attack.

Thus, an alert 112 (e.g., of FIG. 1) can be implemented as an elevated interrupt-type signal or alert indication that the alert handler 204 receives from other peripheral devices and that is indicative of a potential security threat. In operation, the alert handler 204 can gather alerts from other circuit components 108 of the security circuitry 106 and convert them into interrupts that the processor 202 can address. If the processor 202 does not clear the interrupt, however, the alert handler 204 provides hardware responses to address the potential security threat.

For some inter-device communications, the alert handler 204 receives differentially signaled synchronous or asynchronous alert indications from peripheral device sources. The peripheral devices 250 can generate alerts based on the functions, knowledge, or sensed parameters of the peripheral devices 250. For other inter-device communications, the alert handler 204 performs ping testing of the alert sources as a robust heartbeat mechanism. A ping monitor of the alert handler 204 (not explicitly shown) requests periodic alert responses from each alert source to ensure communication channels with the alert sources are functioning.

The alert handler 204 can also produce locally sourced hardware alerts based on communication failures. A first locally sourced alert is generated if differential signaling or another prescribed communication protocol with an alert source or an escalation handler fails (e.g., if a signal-integrity check fails). The alert handler 204 generates a second such alert if an alert source or an escalation handler fails to respond to a ping request. Generally, the alert handler 204 can receive incoming alerts from throughout the system, classify the alerts, issue interrupts based on the classified alerts, and escalate interrupts to hardware-based responses if the processor 202 does not clear an issued interrupt. The alert handler 204 can therefore act—e.g., as a stand-in for security responses-if the processor cannot or does not handle a security alert.

In some architectures, a security alert is intended to be a rare event, at least relative to "standard" interrupts. Accordingly, at a design stage, a possible event may be designated as an alert event to the extent the event is expected to not happen frequently and if the event has potential security consequences. Examples of such events are parity errors (which might indicate an attack), unauthorized actions on cryptographic or security-related components, sensed values from physical sensors indicating environmental modification (e.g., voltage or temperature), and so forth. The system routes alerts through the alert handler 204, which converts the alerts to interrupts for the processor 202 to potentially address. An underlying expectation, for some implementations, is that a secure operating system has a protocol for handling in software any such interrupt that arises due to an alert. If so, the secure operating system can usually resolve the interrupt and then clear the interrupt with the alert handler 204. Each peripheral device 250 can present a list of individual alerts that represent respective potential threats to be handled. Peripheral devices can transmit an alert as an alert indication to the alert handler 204 using a particular encoding mechanism.

The security circuitry 106 can also include the RNG 232. Generally, randomness can contribute to the security functionality by providing variations in execution that can keep attackers from predicting a good time to launch an attack. A random number, for instance, can provide secret material used for identity and cryptographic purposes. The RNG 232 can be seeded into algorithmic computation to obscure sensitive data values. Generally, the RNG 232 provides better performance as its number generation increasingly becomes truly random and to the extent it can also be hardened against attack. The RNG 232 may be implemented as a "true" RNG (TRNG), which may involve a design having an analog portion to take advantage of some physical event or process that is non-deterministic. Example TRNG designs rely on metastability, electronic noise, timing variations, thermal noise, quantum variation, and so forth. The TRNG filters the resulting variable(s) and sends them into a pool of entropy that the device can sample at a given time for a current randomized function. In some cases, an interface to the entropy pool can include a read request of available random bits. The TRNG interface indicates how many bits are available, and the requesting peripheral device or software can read from this pool to the extent bits are available. Attempted reading of entropy bits that are not available can trigger an interrupt or an alert.

Two other peripheral devices 250 include the timer 234 and the flash controller 216, the latter of which is described in the following paragraph. The timer 234 can, for example, support accurate performance by the processor 202. The timer 234 is formed from multiple bits (e.g., 64 bits) and operates as a free-running timer with a guaranteed frequency to within some percentage. Another timer (not explicitly shown) can act as a watchdog timer to backstop the processor 202 in case the processor becomes unresponsive. The unresponsiveness may be due to development code that is wedged, a security attack, and so forth.

The flash controller 216 controls the flash memory 210, which is available for code and data storage. The primary read path for this data can be in the standard memory address space. Writes to that address space can be ignored, however, because flash is not written to in a standard way: Instead, to write to the flash memory 210, software interacts with the flash controller 216. The flash functionality can include three primary commands: read, erase, and program. Read commands can be standardized and can use the chip memory address space. Erase commands are performed at a page level, where the page size is parameterizable by the flash controller 216. Upon receiving an erase request, the flash controller 216 wipes the contents of the target page, which renders the data into a "1" state (e.g., 0xFFFFFFFF per word). Afterward, software can program individual words to any value. A flash bit is not returned to a "1" state without another erase, so future content is effectively changed with an AND of the current content and the written value. Erase and program commands are relatively slow: A typical erase time is measured in milliseconds, and program times are in the range of microseconds. Security is also a concern because secret data may be stored in the flash memory 210. Some memory protection can therefore be provided by the flash controller 216.

The security circuitry 106 is depicted in FIG. 2 with a particular set of circuit components. A given security circuitry 106 can, however, have more, fewer, or different circuit components. The circuit components may also be interconnected differently or operate in manners besides those example manners described above. Further, some circuit components may be omitted while other circuit components are implemented in multiple instances. For example, the alert handler 204 may be duplicated or distributed, or multiple AES encryption engines 212 may be present in some security circuitry 106. Further, a GPIO interface 220 may be omitted from among the peripheral devices 250 of security circuitry 106 for IC chips in which the security circuitry 106 forms but one core among dozens.

Example Schemes, Techniques, and Hardware of a Comportable Paradigm for a Secure ROM Peripheral Device The security circuitry 106 (e.g., of FIGS. 1 and 2) can include comportable circuit components, including the peripheral devices 250, such as a ROM 206 or 118. This section describes example approaches to making peripheral devices comportable. Each peripheral device 250 can adhere to comportability specifications for the security circuitry 106. By adhering to a comportability specification that defines at least one interface scheme or communication protocol, a peripheral device 250 is realized with at least one interface that produces consistent and expected interactions between the peripheral device 250 and other peripheral devices. This produces increased communication predictability and certainty and decreases the time involved to design and test security circuitry.

Figures 1, 3:
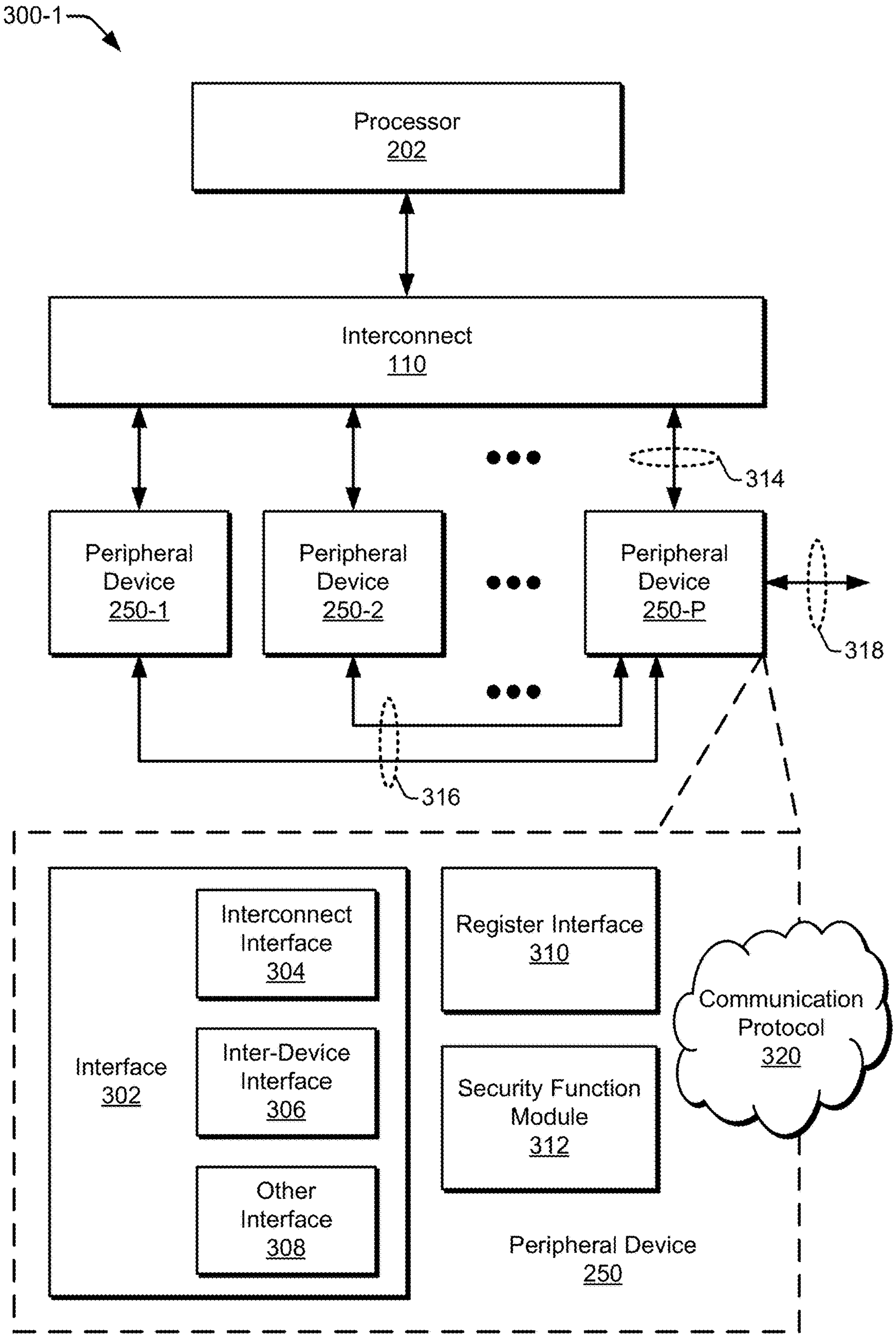
Figures 2, 3:
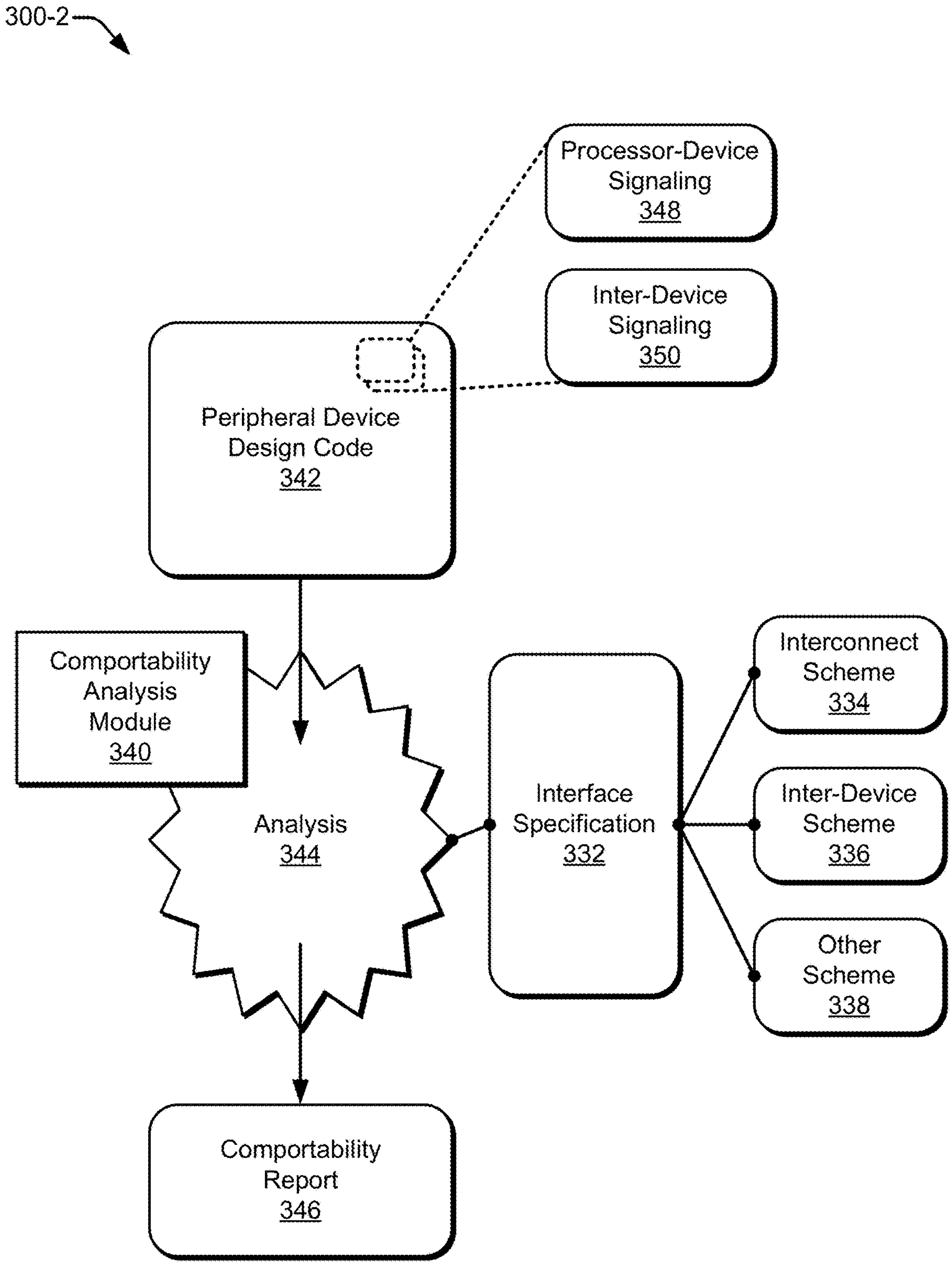
Figure 3:
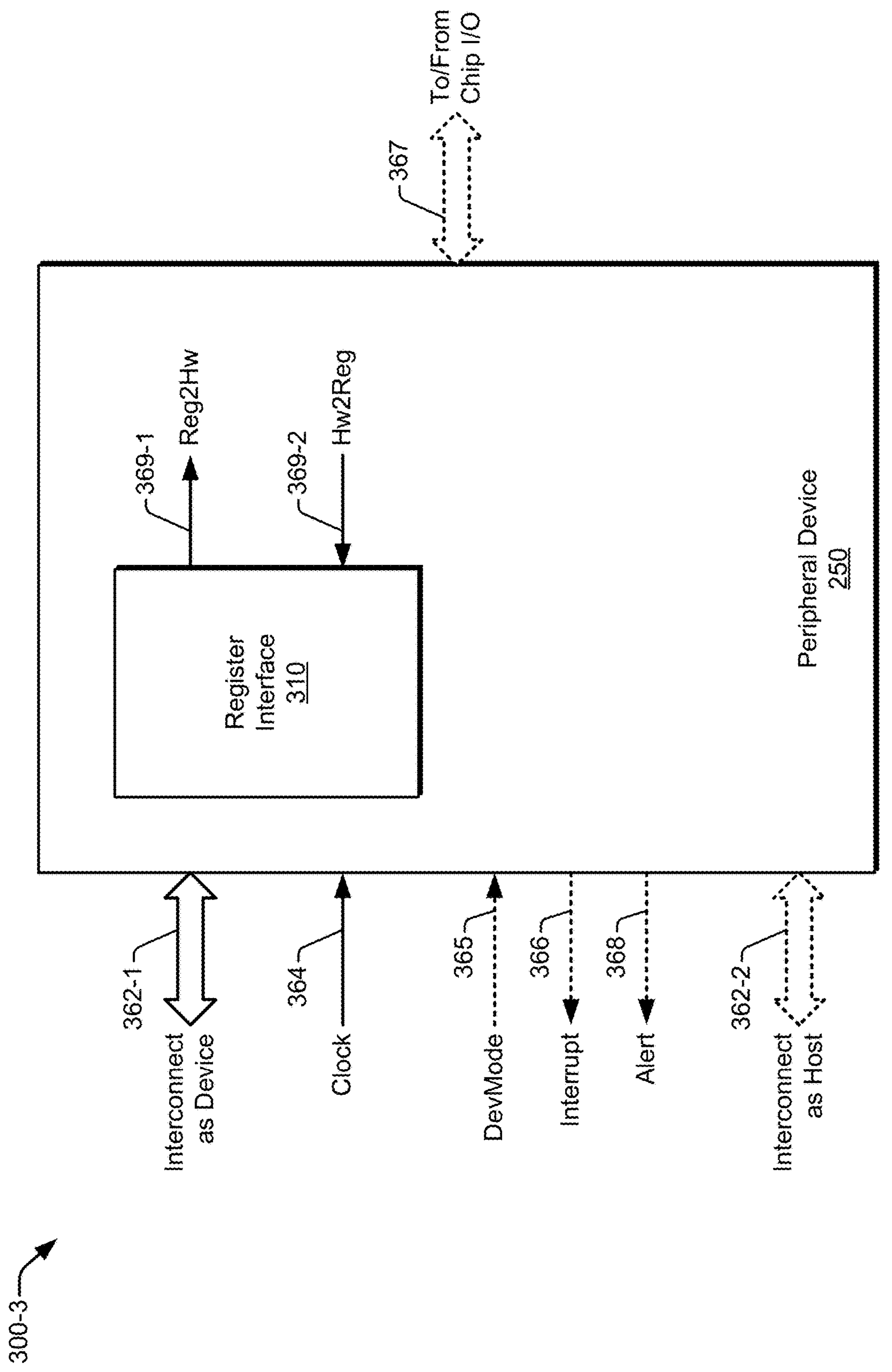

FIG. 3-1 illustrates at 300-1 an example peripheral device 250 including at least one interface 302 to support comportability with other circuit components. More generally, FIG. 3-1 includes an interconnect 110, a processor 202 coupled to the interconnect 110, and multiple peripheral devices coupled to the interconnect 110. Thus, the multiple peripheral devices can at least be coupled to the processor 202 via the interconnect 110. Each peripheral device 250 may, however, also be coupled to the processor 202 directly or otherwise without using the interconnect 110. FIG. 3-1 explicitly depicts P peripheral devices 250-1, 250-2, . . . , 250-P, with P representing a positive integer.

In example implementations, each peripheral device 250 includes at least one interface 302 that enables the peripheral device 250 to adhere to a communication framework that provides certainty for interoperating peripheral devices. For example, the interface 302, or communication interface 302, can enable the peripheral device 250 to implement at least one communication protocol 320. The interface 302 includes at least one interconnect interface 304, at least one inter-device interface 306, and at least one other interface 308. These interfaces are described below: As shown, the peripheral device 250 also typically includes at least one register interface 310 and at least one security function module 312. Generally, the interface 302 enables the peripheral device 250 to adhere to a common framework for interacting with the processor 202 and with other peripheral devices of the multiple peripheral devices 250-1 . . . 250-P.

The register interface 310 includes one or more registers or register entries. Each register entry can be used, for example, for communication to or from (e.g., for communication into or out of) the peripheral device 250. For example, the processor 202 or another peripheral device can set or clear a register entry or can load a register entry with a value to communicate with the peripheral device 250. Conversely, the peripheral device 250 may change a value of a register entry to communicate with the processor 202 or another peripheral device. To enable this communication, the peripheral device 250 can expose at least part of the register interface 310 to the processor 202 or another peripheral device. For instance, the peripheral device 250 can provide the processor access to clear an interrupt state indication.

Generally, the register block can be used to communicate with the remainder of the peripheral logic to manage configuration and status communication, e.g., with software. In some cases, the register interface 310 can be implemented using control and status registers (CSRs). The CSRs provide a collection of registers within a peripheral device 250, the registers of which are addressable at least by the local host processor 202 via a circuit-wide, or chip-wide, address map. The CSRs can be standardized to enhance software uniformity and to facilitate circuit reuse and documentation consistency. Example aspects of the register interface 310 are described below with reference to FIG. 3-3.

The security function module 312 implements a security-related function of the peripheral device 250. Security-related functions include core or primary security functions and supporting or secondary security functions. Core security functions can include, for example, alert handling, cryptographic operations including encrypting and decrypting, random-number generation, secure data storage including storing and accessing secret data (e.g., key management), and so forth. Supporting security functions can include those that enable or facilitate performance of the core functions. Examples of supporting security functions include memory storage, memory control, timing, circuit and chip I/O control, environmental sensors, bus hosting, and so forth.

The interface 302 generally, or any of the specific example interfaces (e.g., the interconnect interface 304, the inter-device interface 306, or the other interface 308), can establish at least one register for the register interface 310 to enable a respective interface communication capability or feature. Regarding the interconnect interface 304, the interconnect interface 304 implements a communication interface that couples to the interconnect 110 to enable, for example, a connection between the peripheral device 250 and the processor 202 that adheres to a common framework. With the peripheral device 250 and the processor 202 comporting with the same common framework, device-processor communications in both directions can be standardized and predictable. The interconnect interface 304 can operate across the interconnect 110, can use at least one register of the register interface 310, can use a separate bus or independent wires, some combination thereof, and so forth. In operation, the peripheral device 250 can use the interconnect interface 304 to engage in at least one interconnect communication 314. Additionally or alternatively, the peripheral device 250 may use the interconnect interface 304 to communicate with another peripheral device via the interconnect 110.

The inter-device interface 306 implements a communication interface between the peripheral device 250 and one or more other peripheral devices that adhere to a common framework. With the peripheral device 250 and each other peripheral device comporting with the same common framework, device-device communications in both directions can be standardized and predictable. The inter-device interface 306 can use at least one register of the register interface 310, can use a bus dedicated to the peripheral devices, can use one or more independent wires extending between two peripheral devices, some combination thereof, and so forth.

In operation, the peripheral device 250 can use the inter-device interface 306 to engage in at least one inter-device communication 316. By bypassing the interconnect 110 to communicate with another peripheral device, the peripheral device 250 can communicate "directly" with the other peripheral device in some implementations. Further, by establishing and adhering to an inter-device communication scheme, consistency and certainty are promoted for communications between two or more devices. Accordingly, designers can focus on achieving the intended security-related function of the security function module 312 instead of expending time and resources tracking and double-checking numerous ad hoc communication regimes.

The other interface 308 implements a communication interface between the peripheral device 250 and another circuit component that adheres to a common framework. With the peripheral device 250 and the other circuit component comporting with the same common framework, peripheral device signaling in both directions can be standardized and predictable. An example of the other interface 308 is a chip I/O interface for communicating information externally. Another example of the other interface 308 is an interrupt interface, if interrupts are not communicated fully via the interconnect 110. Yet another example of the other interface 308 is a clock interface. In some cases, the security circuitry 106 (not separately indicated in FIG. 3) includes a primary system clock and one or more secondary system clocks. A clock interface can utilize the primary system clock and at least a selected portion of the secondary system clocks for communication timing and general functionality. The clock interface can operate in accordance with a clock scheme for the security circuitry 106, and design code for the peripheral device 250 can specify the clocks that are relevant to the peripheral device 250. In operation, the peripheral device 250 can use the other interface 308 to engage in at least one other communication 318 with another circuit component, like I/O circuitry or a clock tree.

FIG. 3-2 illustrates an example approach 300-2 to analyzing a peripheral device design to ensure comportable objectives are satisfied. In example implementations, the approach 300-2 uses an interface specification 332 that can include an interconnect scheme 334, an inter-device scheme 336, or another scheme 338 (including each of the schemes). The interface specification 332 corresponds to the interface 302 (of FIG. 3-1). The interconnect scheme 334 corresponds to the interconnect interface 304, the inter-device scheme 336 corresponds to the inter-device interface 306, and the other scheme 338 corresponds to the other interface 308. These schemes can additionally or alternatively include a local or chip-level I/O scheme, an interrupt scheme, a clock scheme, and so forth.

Accordingly, the interface specification 332 can establish the rules, protocols, attributes, options, capabilities, etc. for the interface 302. Similarly, each of the interconnect scheme 334, the inter-device scheme 336, and the other scheme 338 can respectively establish the rules, protocols, attributes, options, capabilities, etc. for the interconnect interface 304, the inter-device interface 306, and the other interface 308. During design time, the designer develops each peripheral device 250 to adhere to each relevant scheme of the interface specification 332. For instance, the inter-device scheme 336 may establish a format for defining inter-device signaling that bypasses the interconnect 110 of the security circuitry 106. By doing so, a comportable peripheral device 250 can be produced that enhances interoperability and reduces design and development time, as well as testing and debugging efforts. For example, a peripheral device 250 can communicate a signal (e.g., an inter-device signal) to another peripheral device using circuitry derived from an attribute specified by the design code for the peripheral device.

In example approaches, a comportability analysis module 340 can perform an analysis 344 of design code to check for comportability. A designer produces a peripheral device design code 342 with reference to the interface specification 332. Thus, the peripheral device design code 342 meets comportability objectives by adhering to the interface specification 332. The peripheral device design code 342 may be realized at least partially using, for instance, a configuration file. The peripheral device design code 342 can include one or more indications of processor-device signaling 348 (e.g., defining aspects of an interconnect communication 314 between a peripheral device 250 and a processor 202), one or more indications of inter-device signaling 350 (e.g., defining aspects of an inter-device communication 316 between a peripheral device 250 and another peripheral device), and so forth. The one or more indications of inter-device signaling 350 can relate, for instance, to signals exchanged between two or more peripheral devices, including without using the interconnect 110 of the security circuitry 106. These indications can follow the rules and guidelines for registers, signal naming, data types, timing, and so forth for these signals.

Descriptions in the peripheral device design code 342 result in circuit components in the security circuitry 106. For example, regarding an inter-device interface 306 of a respective peripheral device 250 (e.g., of FIG. 3-1), based on an attribute included in the design code 342 therefor, the inter-device interface 306 can be coupled to at least one wire that extends to another peripheral device to enable inter-device signaling. By specifying inter-device signaling 350 in the design code 342, interoperability and communication certainty are increased. The interface specification 332 or the configuration file of the design code 342 can indicate the peripheral features that are mandatory and those that are optional in a given comportability framework. Thus, compliant design code may include a mandatory portion and an optional portion in some situations. Generally, the design code 342 can be formatted in accordance with any IC design or configuration platform. Examples include Verilog, Python, Hjson, and so forth.

In operation, the comportability analysis module 340 accepts the peripheral device design code 342. With reference to the interface specification 332, the comportability analysis module 340 performs an analysis 344 to check whether the peripheral device design code 342 is compliant with the specified common framework. The comportability analysis module 340 can compare the peripheral device design code 342 to one or more of the interconnect scheme 334, the inter-device scheme 336, or the other scheme 338 to check whether the code meets the specifications of each. Any of these schemes may include specifications relating to interrupts, register usage, and so forth. Based on the analysis 344, the comportability analysis module 340 produces a comportability report 346.

The comportability report 346 indicates whether the peripheral device design code 342 passes the analysis 344 by meeting the criteria of the interface specification 332. If not, the comportability analysis module 340 can include a list of "infractions" in the comportability report 346. Each infraction can include a reference to the code portion that is causing a failure indication or a reference to the part of the interface specification 332 that is being violated. Although the interface specification 332, the comportability analysis module 340, and the peripheral device design code 342 may be described with regard to an example security circuitry environment, the interface specification 332, the comportability analysis module 340, or the peripheral device design code 342 may be implemented in other environments. Accordingly, a comportability report 346 may cover an analysis of general circuit designs.

FIG. 3-3 illustrates at 300-3 an example peripheral device 250 including a register interface 310 and example communication signals. In FIG. 3-3 generally, but by way of example only, communication channels or signals that are mandatory (in this example instance of the present disclosure) are depicted with solid lines, and communication channels or signals that are optional are depicted with dashed lines. In other instances, however, different channels or signals may be mandatory or optional. Further, lines in other figures that are solid or dashed are not necessarily indicative of a requirement or a lack of a requirement, respectively, under a given interface specification.

In example implementations, various signals can be specified as part of a framework for comportability to which the peripheral device 250 is to adhere. Starting with the top left, a bidirectional signaling 362-1 using the interconnect 110 is depicted with the peripheral device 250 functioning as a device (e.g., functioning as a follower) relative to the interconnect 110. Below that, the peripheral device 250 is shown as receiving at least one clock signal 364 and at least one development mode signal 365. The development mode signal 365 represents an indication to the peripheral device 250 of what mode the security circuitry 106 or an overall SOC is currently operating in. In other words, there can be multiple modes of operation. With two example modes, the multiple modes can include a development mode and a production mode. The mode indication may determine, for instance, how software errors are handled. Other modes may enable a security feature that conveys the full life cycle mode status to the peripheral device.

The peripheral device 250 can also generate or output at least one interrupt signal 366 or at least one alert signal 368. Further, a bidirectional signaling 362-2 using the interconnect 110 is depicted with the peripheral device 250 functioning as a host (e.g., functioning as a leader) relative to the interconnect 110. The peripheral device 250 can further engage in bidirectional signaling 367 with the GPIO interface 220 or other chip I/O circuitry. Regarding the register interface 310, at least one outgoing signal 369-1 is labeled as a register-to-hardware (Reg2Hw) signal. At least one incoming signal 369-2, on the other hand, is labeled as a hardware-to-register (Hw2Reg) signal. Generally, in some implementations, certain features are deemed mandatory, while other features are considered optional. These mandatory and optional categories may, however, vary between different implementations. With a comportable design, these two categories can be assigned per-feature so that each peripheral device 250 interoperates with other peripheral devices appropriately.

Having generally described schemes, techniques, and hardware for peripheral devices in a comportable paradigm, including for an example ROM peripheral device providing ROM security, this discussion now turns to schemes, techniques, and hardware for ROM security.

Example Schemes, Techniques, and Hardware for ROM Security

This section describes an example ROM controller that can be included in a ROM block with a ROM array (e.g., that stores a mask ROM). The ROM block or module can attach to the system bus as a peripheral device, such as in accordance with the comportability principles described above. In example implementations, as part of the ROM block, the ROM controller interfaces between the system bus and the mask ROM. The ROM has encrypted contents. The encryption may entail relatively lighter-weight or lower-cost encryption, like scrambling. In some cases, the contents can be scrambled with a fixed key that can be derived from a global constant. The encryption may, however, be implemented with a more complicated or higher-cost encryption scheme. Regardless of the encryption scheme or cipher key that is employed, the ROM controller can decrypt (e.g., descramble) the contents on memory fetches from the ROM array.

Unlike some SRAM controllers, which can perform equivalent decrypting or encrypting tasks for SRAM, the ROM controller can also contain a ROM checker circuit. This ROM checker circuit can orchestrate computation of a cryptographic hash of the ROM contents—e.g., right after boot or reset as part of an initialization process to provide an integrity check. Thus, the ROM checker circuit can detect malicious changes that have been made to the mask ROM while the system was at rest.

The ROM block can provide several features. For example, the ROM block can include logic for memory and address scrambling and/or descrambling. Second, the ROM block can perform a post-boot ROM integrity check. Further, the ROM block can provide or issue an alert trigger and/or status information for the control and status registers (CSRs) for ROM integrity errors or finite state machine (FSM) glitches. These and other example aspects of a ROM 118/206 are described in this section with reference to FIGS. 4 to 8.

Figure 4:
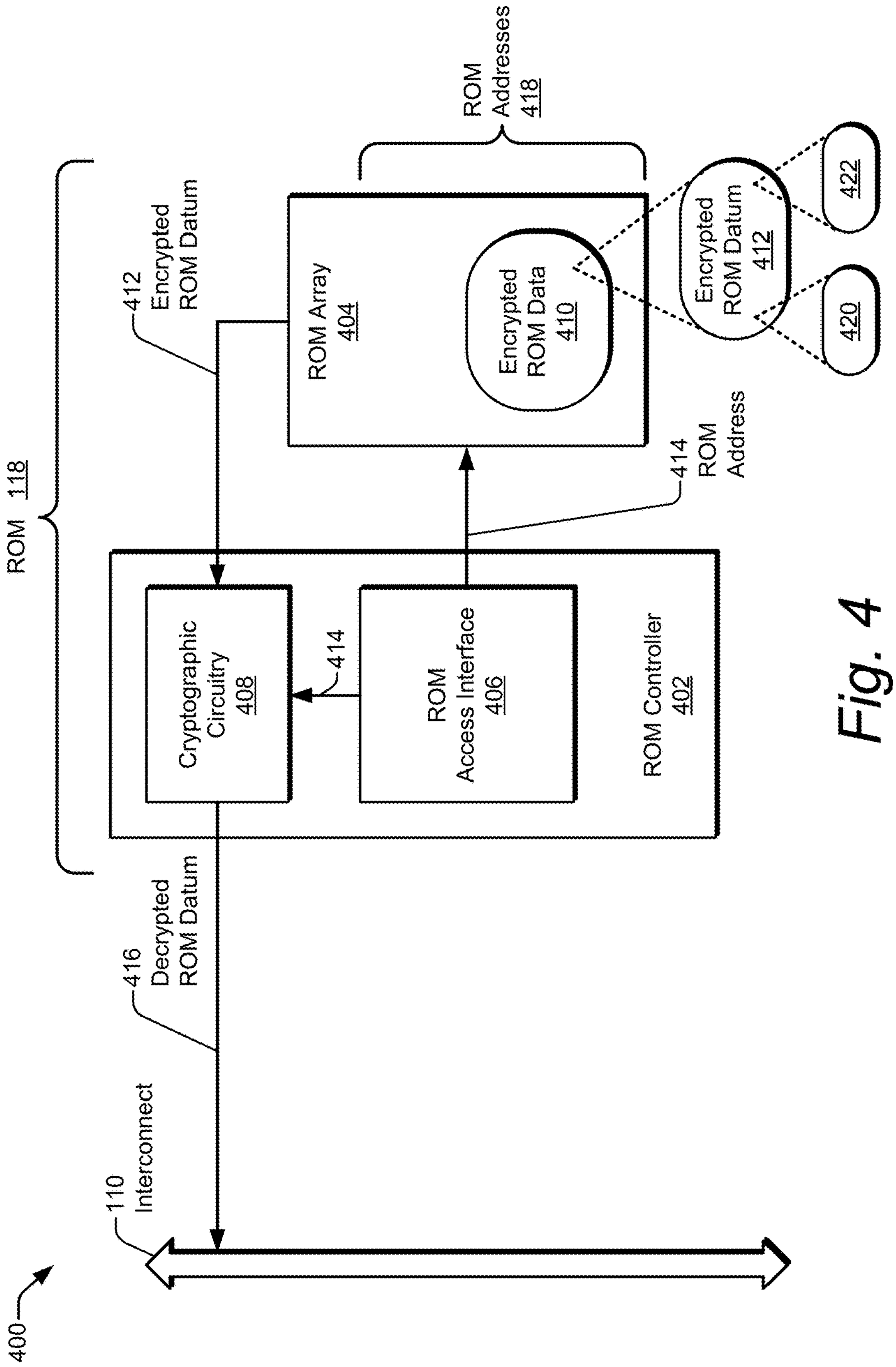
FIG. 4 illustrates an example ROM including a ROM controller and a ROM array with regard to accessing encrypted ROM data of the ROM array.

FIG. 4 illustrates, at 400 generally, an example ROM 118 including a ROM controller 402 and a ROM array 404 with regard to accessing data of the ROM array 404. As shown, the ROM controller 402 can include a ROM access interface 406 and cryptographic circuitry 408. In example implementations, the ROM array 404 includes encrypted ROM data 410 stored at multiple ROM addresses 418. The ROM controller 402 is coupled to the ROM array 404. Generally, the cryptographic circuitry can perform a decryption operation on the encrypted ROM data 410 based on the multiple ROM addresses 418.

The ROM access interface 406 is coupled to the cryptographic circuitry 408 and the ROM array 404. In example ROM reading or data fetching operations, the ROM access interface 406 reads an encrypted ROM datum 412 from the ROM array 404 based on a ROM address 414 corresponding to the encrypted ROM datum 412 (e.g., the ROM address 414 may be the address of the location where the encrypted ROM data 412 is stored). The ROM access interface 406 also decrypts the encrypted ROM datum 412 to produce a decrypted ROM datum 416 using the cryptographic circuitry 408. The ROM access interface 406 may also forward the decrypted ROM datum 416 to an interconnect 110.

In some cases, the ROM access interface 406 decrypts the encrypted ROM datum 412 to produce the decrypted ROM datum 416 using the ROM address 414 corresponding to the encrypted ROM datum 412. Thus, the cryptographic circuitry 408 can perform the decryption operation on a respective ROM datum 412 of the encrypted ROM data 410 based on a respective ROM address 414 of the multiple ROM addresses 418. The respective ROM address 414 can identify the respective ROM datum 412 in the ROM array 404, such as by indicating a memory location thereof. As described below; the ROM address 414 may comprise a scrambled address that points into the ROM array 404 "directly" or an unscrambled address that points into the ROM array 404 "indirectly," such as after the unscrambled address is adjusted to produce a scrambled one.

The ROM access interface 406 can be realized with at least one finite state machine (FSM) that is designed and/or programmed to provide access to the encrypted ROM data 410 as decrypted ROM data (e.g., as multiple instances of a decrypted ROM datum 416) for a bootup procedure for security circuitry 106 (e.g., of FIG. 1) or an electronic device. The FSM, or other implementation of a ROM access interface 406, can direct operation of the cryptographic circuitry 408.

The cryptographic circuitry 408 can include keystream circuitry (not shown in FIG. 4) that can produce one or more keys based on the ROM addresses 418. The cryptographic circuitry 408 can also include data combination circuitry (not shown in FIG. 4) that is coupled to the keystream circuitry. The data combination circuitry produces the decrypted ROM datum 416 based on the encrypted ROM datum 412 and at least one key of multiple keys. In some cases, the cryptographic circuitry 408 further includes a permutation circuit (not shown in FIG. 4) that permutes the encrypted ROM datum 412 to produce a permuted encrypted ROM datum. The data combination circuitry then combines bits of the at least one key and bits of the permuted encrypted ROM datum using a logical operation to produce the decrypted ROM datum 416. Example implementations of cryptographic circuitry 408 are described below with reference to FIG. 6.

Each entry of the encrypted ROM data 410 may include, for instance, a ROM instruction 420 and a check code 422, such as an error-correction code (ECC). In such cases, the encrypted ROM datum 412 can include bits corresponding to the ROM instruction 420 and bits corresponding to the check code 422 for the ROM instruction 420. The bits corresponding to the ROM instruction 420 and the bits corresponding to the check code 422 for the ROM instruction 420 are intermingled, mixed, or "smooshed" together such that their respective bit positions are unknown. In contrast, the decrypted ROM datum 416 can include the bits corresponding to the ROM instruction 420 and the bits corresponding to the check code 422 for the ROM instruction 420 in a form in which the two sets of bits are separated from one another, or at least a form in which their relative bit positions are known.

In some implementations, the decrypted ROM instruction and the associated check code may be passed by the ROM 118 to another component over the interconnect 110. In other implementations, the ROM controller 402 can include a ROM checker circuit (e.g., a ROM checker circuit 616 of FIG. 6). The ROM checker circuit 616 can be coupled to an output of the cryptographic circuitry 408. In example operations, the ROM checker circuit 616 computes another check code based on the ROM instruction 420 of the decrypted ROM datum 416. The ROM checker circuit 616 also performs a comparison including the check code 422 of the decrypted ROM datum 416 and the computed check code. The ROM checker circuit 616 can further generate an error signal based on the comparison. The error signal can be transmitted as an alert signal and/or an interrupt signal to an alert handler and/or a processor, respectively.

As described below with reference to FIGS. 8 and 10, each encrypted ROM datum 412 of the encrypted ROM data 410 that is stored at the multiple ROM addresses 418 of the ROM array 404 is distinct (in some implementations) from each other encrypted ROM datum 412' of the encrypted ROM data 410 stored at the multiple ROM addresses 418 of the ROM array 404. This distinction (or encrypted ROM datum uniqueness) is due, at least in part, to an encryption scheme that is based on the multiple ROM addresses 418. For example, the encryption scheme and/or at least one cipher key used in a given encryption scheme can be selected to ensure that each original ROM datum results in a distinct encrypted ROM datum.

Figure 5:
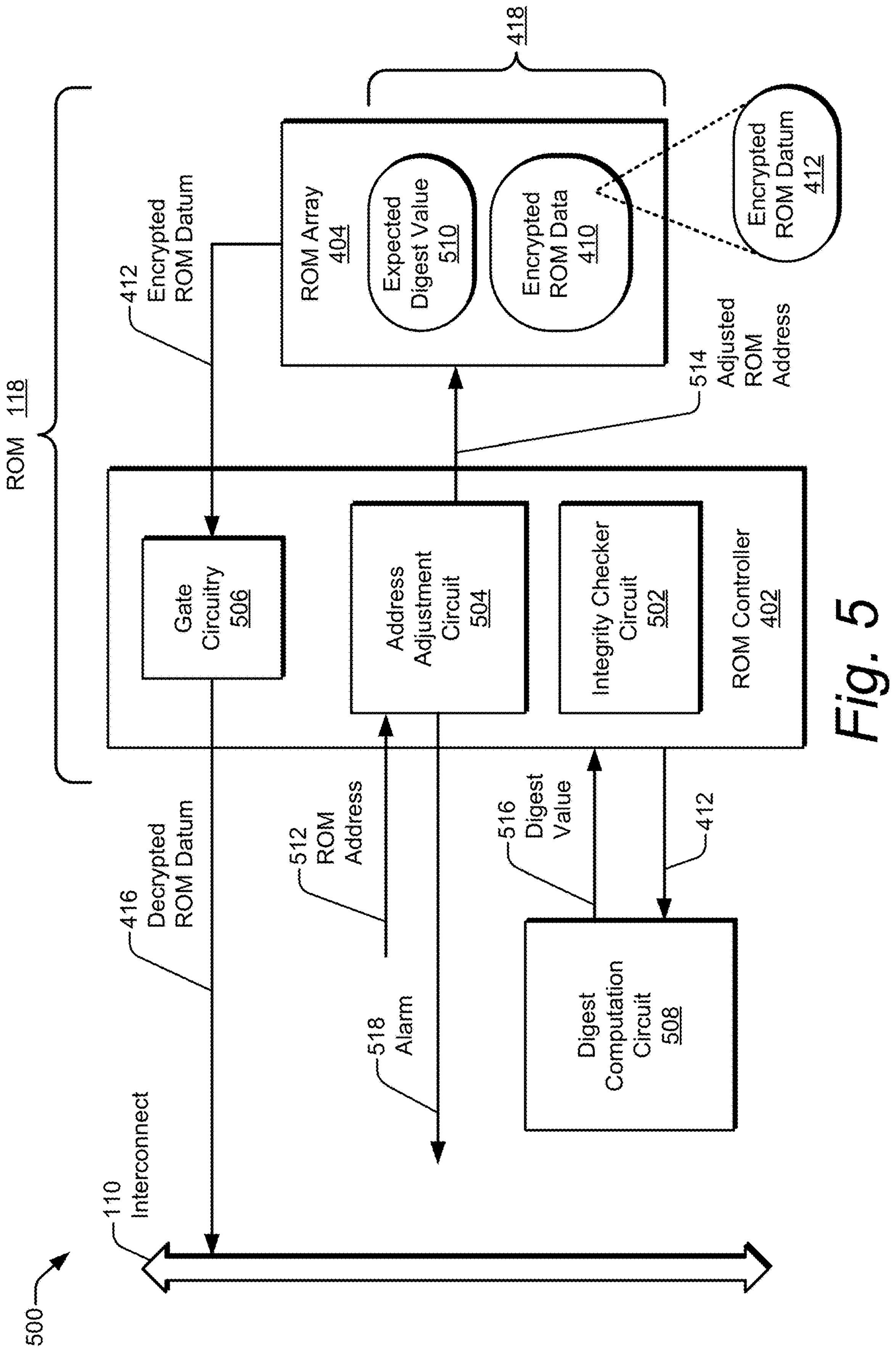
FIG. 5 illustrates an example ROM including a ROM controller and a ROM array in the context of checking an integrity of encrypted ROM data of the ROM array.

FIG. 5 is described next and illustrates additional and/or alternative aspects of an example ROM 118. It should be understood, therefore, that aspects of FIG. 4 can be combined with one or more of the aspects of FIG. 5, and vice versa. For example, the address adjustment circuit 504 of FIG. 5 can be included with the circuitry of FIG. 4. In such cases, the ROM controller 402 can include an address adjustment circuit 504 that adjusts ROM addresses to produce adjusted ROM addresses. This may entail converting a ROM address from unscrambled to scrambled (e.g., from a logical address that is adjusted to produce a physical address). The ROM access interface 406 adjusts the ROM addresses to read the encrypted ROM data 410 stored at the multiple ROM addresses 418 using the address adjustment circuit 504. The address adjustment circuit 504 may, for instance, permute two or more bits of each ROM address, substitute two or more bits of each ROM address, or permute and substitute two or more bits of each ROM address of the ROM addresses 418 to produce the adjusted ROM addresses. Other example implementations that illustrate aspects of FIGS. 4 and 5 being combined are depicted together in FIG. 6 and described below:

FIG. 5 illustrates, at 500 generally, an example ROM 118 including a ROM controller 402 and a ROM array 404 in the context of checking an integrity of encrypted ROM data 410. As shown, the ROM controller 402 includes an integrity checker circuit 502, an address adjustment circuit 504, and gate circuitry 506. The ROM controller 402 at least has access to a digest computation circuit 508. In some cases, the digest computation circuit 508 is realized as another peripheral device 250 (of FIG. 2) and/or circuit component 108 (of FIG. 1). In other cases, the digest computation circuit 508 can be realized as part of the ROM 118, such as by being part of or separate from the ROM controller 402.

In example implementations, the ROM array 404 includes encrypted ROM data 410 stored at multiple ROM addresses 418. The ROM array 404 may also include at least one expected digest 510 (or "expected digest value 510"). The ROM controller 402 is coupled to the ROM array 404. In example operations, the ROM controller 402 reads an encrypted ROM datum 412 from the ROM array 404 based on a ROM address 512 or 514 corresponding to the encrypted ROM datum 412. The ROM controller 402 also obtains at least one digest value 516 using the encrypted ROM datum 412. To perform the obtaining, the integrity checker circuit 502 may use the digest computation circuit 508. The ROM controller 402 further gates access to the ROM array 404 based on the at least one digest value 516 and the expected digest value 510. The integrity checker circuit 502 may control the gate circuitry 506 to permit/grant or block access to the ROM array 404.

The address adjustment circuit 504 of the ROM controller 402 can adjust a ROM address 512 to produce an adjusted ROM address 514. The ROM controller 402 uses the address adjustment circuit 504 to adjust the ROM addresses 512 to read the encrypted ROM data 410 stored at the multiple ROM addresses 418. The address adjustment circuit 504 can adjust a ROM address 512 by, for example, shifting, swapping, or otherwise manipulating two or more bits of the ROM address 512 to produce the adjusted ROM address 514. The ROM address 414 of FIG. 4 may correspond to the ROM address 512 or to the adjusted ROM address 514.

The ROM controller 402 is configured to obtain the at least one digest value 516 based on causing at least one hashing algorithm to be applied to the encrypted ROM datum 412. Example hashing algorithms are described herein. In some cases, the ROM array 404 and the ROM controller 402 comprise a first peripheral device (e.g., a first peripheral device 250-1, such as the ROM 206, of FIG. 2). A second peripheral device (e.g., a second peripheral device 250-2, such as the HMAC engine 214, of FIG. 2) can implement one or more hashing algorithms. The ROM controller 402 can obtain the at least one digest value 516 by communicating with the second peripheral device. Thus, in these cases, the second peripheral device can include the digest computation circuit 508. In other cases, the ROM 118, including the ROM controller 402 thereof, can instead include the digest computation circuit 508.

As shown in FIG. 5 for some implementations, the ROM controller 402 can read the expected digest value 510 from the ROM array 404. In contrast with the encrypted ROM data 410, the expected digest value 510 may be stored in the ROM array 404 in an unencrypted form. The expected digest value 510 may be stored at any address and/or location of the ROM array 404, and the expected digest value 510 may span one or more lines and/or addresses of the ROM array 404. For example, the expected digest value 510 may be stored in the ROM array 404 at a predetermined location (e.g., the last six ROM entries) corresponding to a determinable ROM address (e.g., at least one ROM address 512 or at least one adjusted ROM address 514 that identifies the last six ROM entries).

The integrity checker circuit 502 can compare the computed digest value 516 and the expected digest value 510. Responsive to the at least one digest value 516 matching the expected digest value 510, the ROM controller 402 can grant access to the ROM array 404 using the gate circuitry 506, e.g., to permit a boot procedure to be performed using the encrypted ROM data 410 or to permit general ROM accessing. On the other hand, responsive to the at least one digest value 516 failing to match the expected digest value 510, the ROM controller 402 can block access to the ROM array 404 using the gate circuitry 506, e.g., to prevent a boot procedure from being performed using the untrustworthy encrypted ROM data 410 or to block general ROM accessing. The ROM controller 402 may also transmit at least one alarm 518 (or "alarm indication 518"). The at least one alarm 518 may correspond to an alert that is communicated from the ROM 118 via a register and/or an interrupt that is transmitted via the interconnect 110 or a dedicated pathway.

The security circuitry can additionally or alternatively provide the computed digest value 516 to one or more other components outside the ROM 118. For example, the ROM controller 402, such as the integrity checker circuit 502 thereof, can transmit the digest value 516 to another component, such as the main processor. The ROM controller 402 can also or instead expose the digest value 516 via at least one register of the ROM 118. Upon reading the value in the register, this enables other component(s) to independently verify the value of the computed digest value 516. Due to the key derivation mechanism, even if an attacker can corrupt the encrypted ROM data 410 and/or the expected digest value 510 (which is stored in the ROM array 404), the attacker has changed the chip identity in a manner that can be detected by the other component(s).

Each encrypted ROM datum 412 of the encrypted ROM data 410 can be established to be varied or disparate, including by being unique or different from each other. For example, each respective encrypted ROM datum 412 of the encrypted ROM data 410 can be different from each other respective encrypted ROM datum 412 of the encrypted ROM data 410 throughout the ROM array 404. In some cases, a cipher key related to encrypting or decrypting the encrypted ROM data 410 is selected to ensure that each respective encrypted ROM datum 412 is different from each other respective encrypted ROM datum 412 for the encrypted ROM data 410 throughout the ROM array 404. In other cases, an encryption algorithm related to production of each encrypted ROM datum 412 is selected to ensure each respective encrypted ROM datum 412 is different from each other respective encrypted ROM datum 412 for the encrypted ROM data 410 throughout the ROM array 404. Techniques for ensuring that most or even each encrypted ROM datum 412 is unique are described further with reference to FIG. 8.

Figure 6:
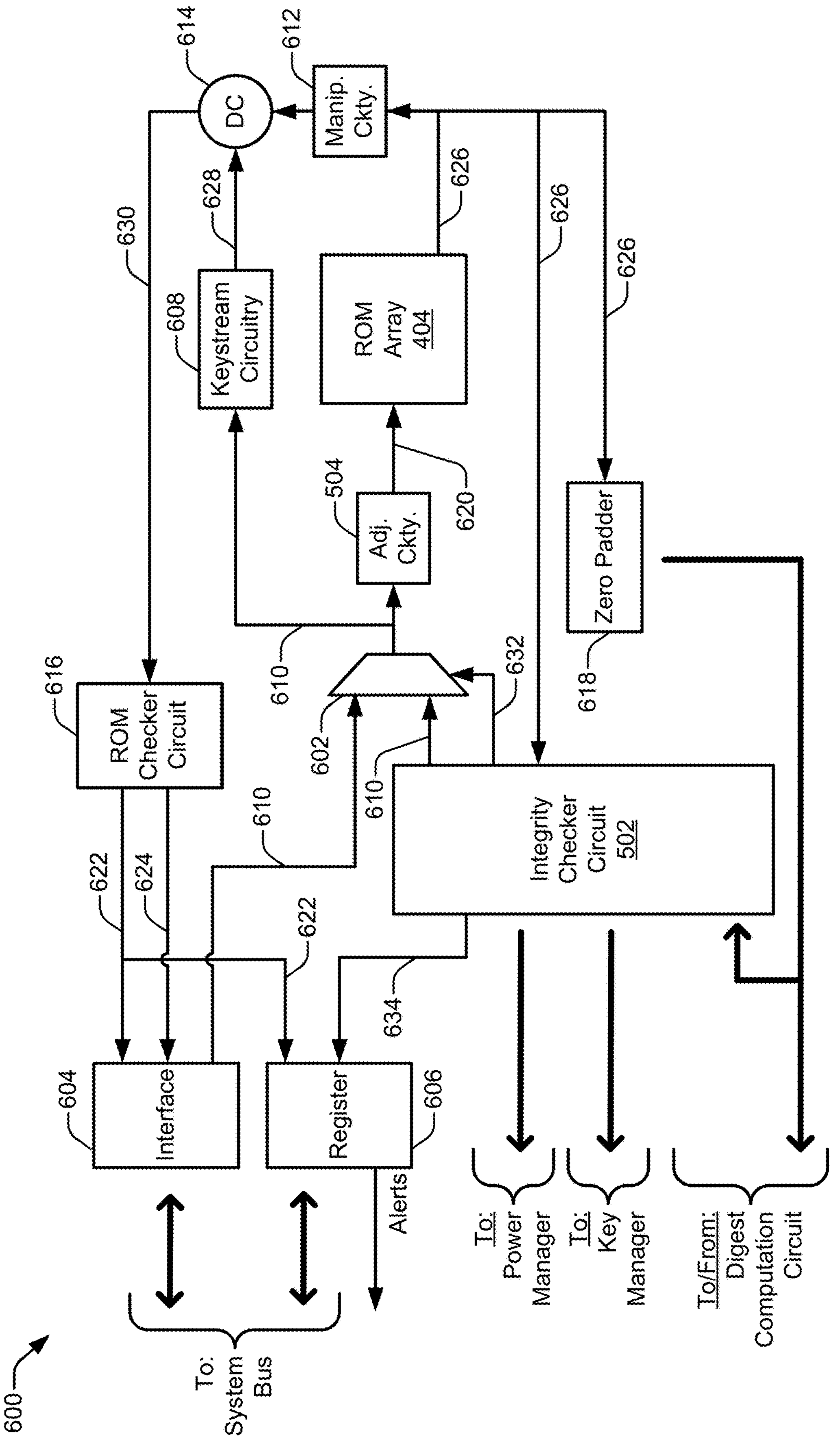
FIG. 6 illustrates an example ROM, which may be implemented as a ROM peripheral device of security circuitry with encrypted ROM data.

FIG. 6 illustrates an example ROM block 600, which may be implemented as a ROM 118 (e.g., of FIGS. 1, 4, and 5) and/or a ROM peripheral device 206 (e.g., of FIG. 2). FIG. 6 depicts a high-level block diagram of an example ROM module implementation. Some depicted blocks may be realized with instantiations of multiuse primitives that may also be used or duplicated elsewhere on a chip or as part of another component of security circuitry. The ROM block 600 includes, from FIGS. 4 and 5, a ROM array 404, an integrity checker circuit 502, and address adjustment circuitry 504.

As shown, the ROM block 600 also includes an interface 604, at least one register 606, a ROM checker circuit 616, a zero padder circuit 618, a multiplexer 602, and an example of cryptographic circuitry 408 (e.g., of FIG. 4). The ROM checker circuit 616 may be realized with an ECC decoder. The cryptographic circuitry 408 can be realized, for example, with keystream circuitry 608, manipulation circuitry 612, and data combination circuitry 614. The data combination circuitry 614 can be implemented with, for instance, a circuit that performs a logical operation, such as an exclusive-or (XOR) operation. The manipulation circuitry 612 can diffuse one or more bits of a ROM datum 626 (which can correspond to an encrypted ROM datum 412 of FIGS. 4 and 5). The manipulation circuitry 612 can be implemented using, for example, permutation circuitry, substitution circuitry, or combined permutation and substitution circuitry (e.g., a substitution-permutation network), as is described further below.

Generally, the upper half of the diagram shows paths for ROM reads while the system is in normal operation. The lower half of the diagram depicts usage of the ROM integrity checker circuit 502. The ROM integrity checker circuit 502 can be triggered by, for instance, a power manager early in the chip boot sequence to check the validity of the ROM image. In some cases, the integrity checker circuit 502 can be configured to run exactly once to prevent an attacker from being able to undermine the system with multiple executions. The integrity checker circuit 502 can release the multiplexer 602 when the integrity-checking procedure finishes with a positive result to grant access to the ROM array as part of gate circuitry 506 (of FIG. 5).

This document now describes an example ROM access when the security circuitry (e.g., a chip) is operating in a normal boot mode or otherwise after an integrity check has been successfully performed. Once the chip has booted, ROM accesses can be requested over an interconnect, such as a system bus (e.g., a TL-UL bus). The ROM block 600 can receive these requests through an interface 604 (e.g., a TL-UL adapter), which is shown in the top-left of FIG. 6. In normal operation, the multiplexer 602 grants access to these bus reads (e.g., TL reads). The address 610 of the read request is adjusted at the address adjustment circuitry 504. For example, the address adjustment circuitry can scramble the address using a substitution-permutation network.

In parallel with the ROM access, the keystream circuitry 608—such as a low-latency, reduced-round PRINCE block-cipher (e.g., having 5 rounds with latency 1, which can be equivalent to a cipher used for the SRAM)-computes a 39-bit truncated keystream for the ROM block. The keystream circuitry 608 generates at least one key using the address from the request as provided to the address adjustment circuitry 504 (e.g., before the address is adjusted). On the following cycle, the scrambled data from the ROM array 404 (e.g., bits for the ROM data and bits for a corresponding ECC, which two sets or types of bits are intermingled in the ROM array 404 and as ROM datum 626) is put through the manipulation circuitry 612, such as another substitution-permutation network. The manipulated (e.g., permuted and/or substituted) ROM data from the manipulation circuitry 612 and the at least one key or keystream from the keystream circuitry 608 are combined by the data combination circuitry 614. In the illustrated example, the key and the permuted scrambled ROM data (with an ECC code) are XOR'd by the XOR operation performed by the data combination circuitry 614. A block cipher like PRINCE can be employed, for example, in "counter (CTR) mode." The counter (e.g., the ROM datum address 610) is encrypted with an N-bit block cipher (e.g., PRINCE) and a given key (e.g., a netlist constant) to produce an N-bit keystream block 628 that can be XOR'd over the data (e.g., the ROM datum 626 corresponding to the ROM datum address 610).

The output from the data combination circuitry 614 is the decrypted 32-bit data, plus seven ECC bits. If the ROM checker circuit 616 is implemented here, these 39 bits can be passed through the ROM checker circuit 616 and back to the interface 604 upon a successful validation with the ECC bits. An ECC decode error can cause an error code (e.g., a read error indicator) to be reported via the interface 604 with error signal 622 by the ROM access responsive to the TL request. The ROM controller can, using the error signal 622, also or instead set at least one register of the registers 606 and/or generate a fatal alert based on the ECC decode error. Although certain bit lengths are provided herein, these are presented by way of example only, for data, ECC, and so forth may have different lengths or be omitted.

In alternative implementations for ECC functionality, the "main" or system bus may be augmented with ECC checking capabilities. In such cases, the circuitry and operation thereof may vary from that which is depicted and described with reference to FIG. 6. For example, the ROM access response 624 may include ROM bits and ECC bits by passing such bits from the descrambling XOR operator of the data combination circuitry 614 "directly" to the interface 604. Thus, the ROM checker circuit 616 and its associated CSRs can be omitted from the ROM block 600 in these alternative implementations.

Figure 7:
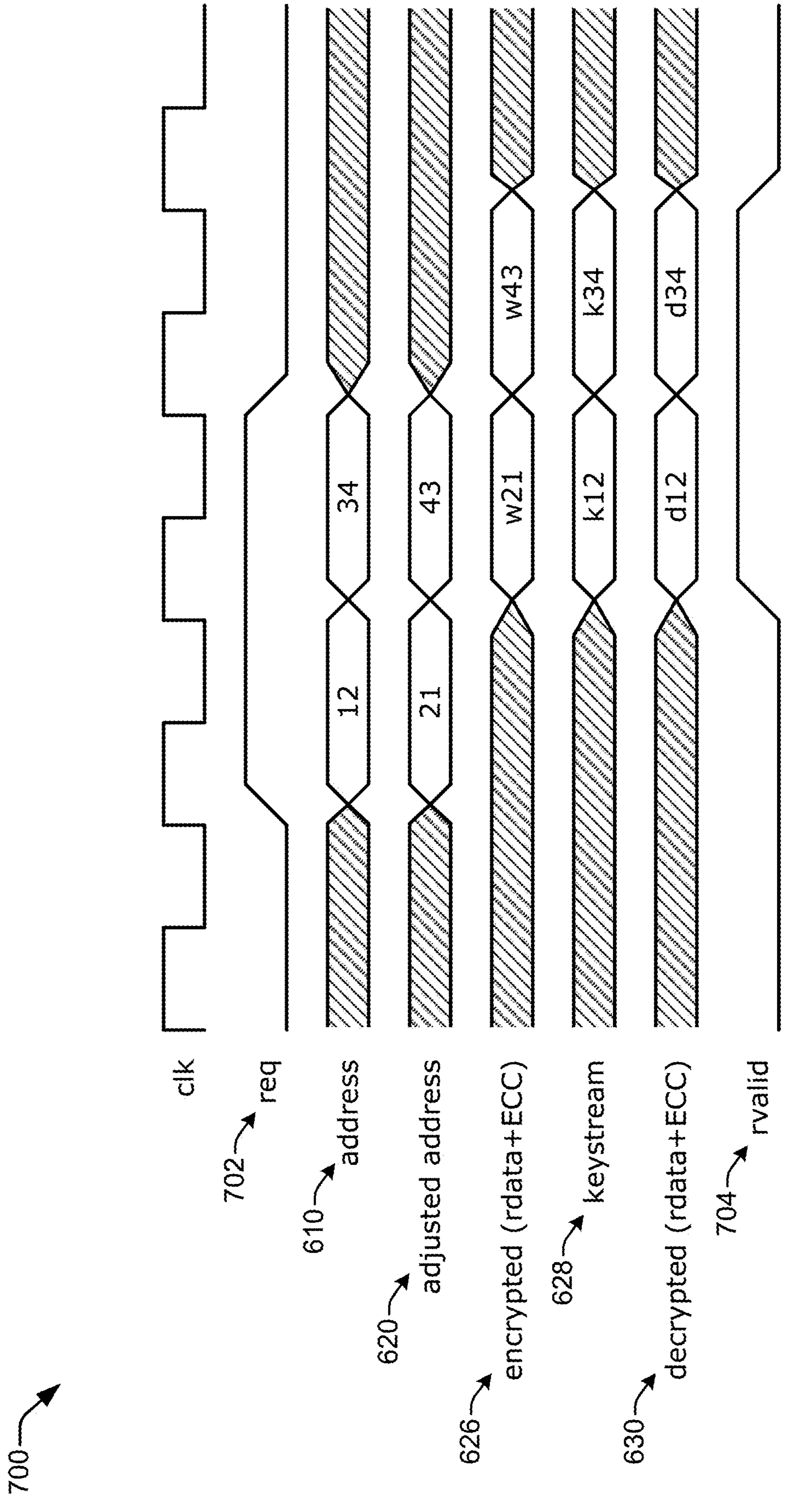
FIG. 7 illustrates an example timing diagram with various signals for accessing a ROM array of the ROM of FIG. 6.

FIG. 7 illustrates an example timing diagram 700 for accessing a ROM array 404 of the ROM block 600 of FIG. 6. The timing diagram 700 depicts the timing of different signals. These example signals map to the signals shown in the ROM block 600 of FIG. 6. The time from when a request 702 (req 702) output is provided from the interface 604 to a time when the response appears on the response or ROM valid 704 (rvalid 704) input of the interface 604 is one cycle. Two examples are shown: an unscrambled or original address of "12" and an unscrambled or original address of "34." The "scrambling scheme" example for the addresses in the diagram is to reverse the digits of each address. Regarding the original or unscrambled "12" address example, the word stored at the scrambled address 21 in the ROM is denoted "w21." The keystream value for unscrambled or original address 12 is denoted "k12." The decrypted ROM data for the unscrambled or original address 12 is denoted with "d12."

With reference to FIG. 6, a PRINCE-block-cipher-based implementation of the keystream circuitry 608 and the two substitution-and-permutation (S&P) network implementations of the address adjustment circuitry 504 and manipulation circuitry 612 can be parameterized by "keys." For the ROM controller, these keys may be global randomized netlist constants: thus, the keys may be assumed to be difficult to recover, but they need not necessarily be secret data. Although particular bit lengths (e.g., of 39 bits and 256 bits) and word sizes (e.g., of 32 bits) are presented in the description herein and/or in the accompanying drawings, these are provided by way of example only. Other implementations may use different bit lengths, word sizes, and so forth.

This document now describes an example startup ROM integrity check. The ROM integrity checker circuit 502 can run, for instance, after reset, including "immediately" after reset, or at least before any reads to the ROM are conducted. Until the ROM checking is completed, the integrity checker circuit 502 controls ROM address requests (e.g., through the multiplexer 602). The select signal 632 for the multiplexer 602 can include a redundant encoding to protect the selection signal against fault injection (FI) attacks. If the select signal 632 has an invalid value, detection of the invalidity can trigger a fatal alert. Before starting to read data from the ROM array 404 as the ROM datum 626 (e.g., which may correspond to the encrypted ROM datum 412 of FIGS. 4 and 5), the ROM integrity checker circuit 502 (or a power manager module) can start cryptographic operation on a cryptographic module (not shown in FIG. 6) to prepare for the ROM checking (e.g., can initiate a cSHAKE operation on a keyed or Keccak Message Authentication Code (KMAC) engine using a signal kmac_cmd_o). An example ROM integrity checking process is described below with reference to the flow diagram of FIG. 9.

A possible physical attack on security circuitry is an attempt to subvert the mask ROM. The regular structure of a mask ROM is useful because it makes metal fixes relatively simple, but for the same reasons, the regular structure can make the ROM a relatively easy target for an attacker. Because the code in ROM may be the first thing to execute, an attacker that modifies the ROM code undetected can completely subvert the chain of trust. Accordingly, the integrity checker circuit 502 can provide a measure of confidence in the ROM code integrity.

In example implementations, after bringing the ROM controller out of reset, the power manager waits until a "check_done_o" signal is asserted before starting the host processor. The power manager can also check that the check_good_o signal is "On." If not, the power manager can refuse to boot. This provides a safety check, and additional security is provided by the key manager integration as described next.

The KMAC interface can assume that the KMAC engine is preconfigured to run the cSHAKE algorithm with a prefix specific to the ROM checker circuit. The ROM checker does not assert a signal "kmac_rom_vld_o" after finishing the one hash computation (or a known number of hash computations). The KMAC engine may, however, ignore the signal after then to allow for simple arbitration that still offers robustness against fault injection attacks.

The integration with the key manager is based on forwarding the digest data in "kmac_digest_share0_i" and "kmac_digest_share1_i" as "keymgr_digest_data_o." This 256-bit digest can be incorporated into the "CreatorRootKey." In some cases, the key manager can permit only one transaction (e.g., of 256 bits/32 bits=8 beats) after reset to pass this information across. In response to any future messages, the key manager can raise an alert, thereby defeating an attacker that tries to trigger extra transactions before or after the correct transaction.

The CreatorRootKey can form a first key in a chain for Identities and Root Keys. An attacker who modifies the ROM will perturb the CreatorRootKey because avoiding doing so would involve a preimage attack on the ROM checksum calculation or the KM DERIVE function. The result is that, while the security chip can function, the chip will have the "wrong" root key, so the chain of trust used for attestation is broken.

Example hardware interfaces in terms of parameters and signals are described next. Descriptions of example ROM controller signals are presented in Table 1 below. These signals may be sent from or received at the integrity checker circuit 502. The "check" related signals may be communicated with the power manager. The "keymgr" related signals may be communicated with the key manager. The "kmac" related signals may be communicated with a KMAC engine or other circuitry performing the hashing operation.

| Signal | Type | Destination | Description |
|---|---|---|---|
| check_done_o | logic | pwrmgr | Becomes high when the ROM check is complete. Remains high until reset. |
| check_good_o | lc_ctrl_p kg:lc_tx_t | pwrmgr | Only valid if check_done_o is high. This is On if the digest computation matched the expected value stored in the top words of ROM and Off otherwise. Stays constant when check_done_o is high. |
| keymgr_digest_data_o | logic [31:0] | keymgr | A 32-bit word of digest data to pass to the key manager. The 256-bit digest is sent in eight 32-bit beats. The interface has a valid signal in keymgr_digest_vld_o and does not support back pressure. |
| keymgr_digest_vld_o | logic | keymgr | Valid signal for keymgr_digest_data_o. |
| kmac_rom_rdy_i | logic | kmac | Ready signal for kmac_rom_data_o. |
| kmac_rom_vld_o | logic | kmac | Valid signal for kmac_rom_data_o. |
| kmac_rom_last_o | logic | kmac | The current word in kmac_rom_data_o is the last one that will be signalled. |
| kmac_rom_data_o | logic [63:0] | kmac | A 64-bit word of scrambled ROM data to send to KMAC. The interface has a valid signal in kmac_rom_vid_o and a ready signal in kmac_rom_rdy_i. |
| kmac_done_i | logic | kmac | The KMAC block has finished computing its digest. Valid signal for kmac_digest_data_i. |
| kmac_digest_share0_i | logic [255:0] | kmac | A share of the 256-bit digest returned from KMAC. The interface has a valid signal in kmac_done_i and does not support back pressure. |
| kmac_digest_share1_i | logic [255:0] | kmac | A share of the 256-bit digest returned from KMAC. The interface has a valid signal in kmac_done_i and does not support back pressure. |

TABLE 1

Example signals communicated with the ROM integrity checker.

Example register values for the registers 606 of the ROM block can include:
ALERT_TEST;
FATAL_ALERT_CAUSE;
DIGEST_0 ... DIGEST_7 (e.g., with a multi-register);
EXP_DIGEST_0 ... EXP_DIGEST_7 (e.g., with a multi-register); and
ROM (e.g., a window into ROM).

Example fields for the FATAL_ALERT_CAUSE register are presented in Table 2 below:

TABLE 2

Example fields for a fatal alert cause register.

| Bits | Type | Reset | Name | Description |
|---|---|---|---|---|
| 0 | ro | 0x0 | fsm_error | Set if a redundantly coded signal or FSM is invalid. |
| 1 | ro | 0x0 | kmac_error | Set if kmac_done_i is signalled when it's not expected. |
| 2 | ro | 0x0 | ecc_error | Set on an ECC error from decoding ROM contents |

With regard to programming and the ROM block, software can interact with the ROM controller by fetching code or loading data from ROM. From this perspective, the ROM block appears to be a block of memory, which is accessible through the system bus. The ROM block can, however, make a few of the registers 606 accessible. The registers can be read-only, except the ALERT_TEST register, which can be writable. The FATAL_ALERT_CAUSE register may change value during operations (e.g., if an alert is signaled), but the other registers of the ROM block can have fixed values by the time software is running.

The integrity checker circuit 502 can load the digest(s) in the registers 606 via the digest signal 634. To obtain the computed ROM digest, software can read DIGEST_0 through DIGEST_7 registers. The ROM array 404 can also contain an expected ROM digest, EXP_DIGEST. Unlike the rest of the contents of the ROM array 404, the contents storing the expected digest may not be scrambled. As such, software cannot read it through the standard ROM interface, which would unscramble it "again," resulting in rubbish data that causes a failed ECC check. In case software is to be given access to this value, the expected digest can be read at EXP_DIGEST_0 through EXP_DIGEST_7.

Figure 8:
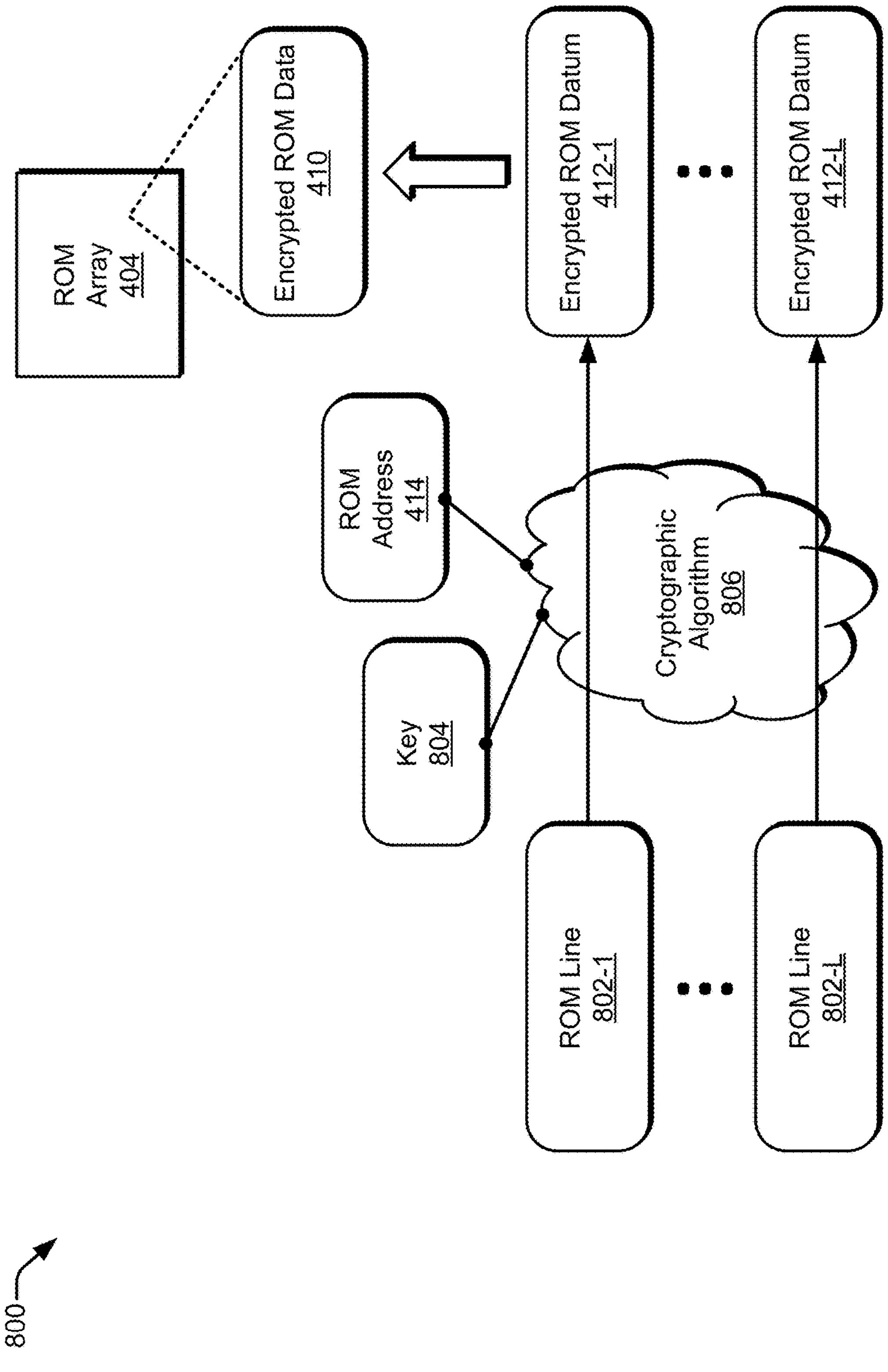
FIG. 8 illustrates an example scheme in accordance with implementations for a resilient ROM integrity checking procedure.

FIG. 8 illustrates, generally at 800, an example scheme in accordance with implementations for integrity check with resiliency. Security circuitry includes a ROM array 404. The ROM array 404 includes encrypted ROM data 410. The encrypted ROM data 410 can include multiple instances of an encrypted ROM datum, such as L instances of encrypted ROM datum 412-1 . . . encrypted ROM datum 412-L, with L representing an integer.

Each respective encrypted ROM datum 412 is produced from a respective "original" ROM line 802-1 using a cryptographic algorithm 806 with at least one key 804 and/or based on a respective ROM address 414 (e.g., the respective ROM address 414 may be used as part of at least one key 804). Accordingly, a first ROM line 802-1 results in a first encrypted ROM datum 412-1, and an Lth ROM line 802-L results in an Lth encrypted ROM datum 412-L. Each ROM line or entry 802 can correspond, for example, to the decrypted ROM datum 416 after an encryption and decryption pair of operations.

In some cases, a particular combination of the cryptographic algorithm 806 and the key 804 can produce two or more instances of an encrypted ROM datum 412 that are identical—i.e., that are not distinct from each other. This can provide another potential avenue of attack by redirecting the ROM integrity checker to a different ROM line having the identical value if another ROM line has been changed in the ROM array 404. More specifically, an attacker might try to attack communication between the checker and the ROM array. This can entail manipulating the data bus (e.g., to hide the changes they made to the ROM data) or attacking the low-order bits of an address bus. For example, the attacker may try to modify a word in the ROM but evade detection of such changes by the hashing computation by redirecting the ROM checker to another copy of an identical word.

To combat this, the cryptographic algorithm 806 and/or the key 804 can be altered or substituted with a different algorithm or key if there are one or more duplicates. With the altered algorithm and/or key, the ROM lines 802-1 . . . 802-L are re-encrypted to produce another set of multiple instances of encrypted ROM datum 412-1 . . . 412-L. This process can be repeated until few, or even zero, instances of encrypted ROM datum 412 are identical.

Unlike some scrambling approaches, which use an ephemeral (and unguessable) key to make attacking data at rest more difficult, the key for ROM scrambling is fixed for each circuit. Such a fixed key will nonetheless provide diffusion and address-linking properties as described above. The key can be derived from a global constant. When building a final design of a security circuitry instantiation, an "extra" check can be performed to ensure a constant is chosen that yields a key in which each word in the ROM is distinct after the scrambling.

Having generally described schemes, techniques, and hardware for ROM security, this discussion now turns to example methods.

Example Methods for ROM Security

Figure 9:
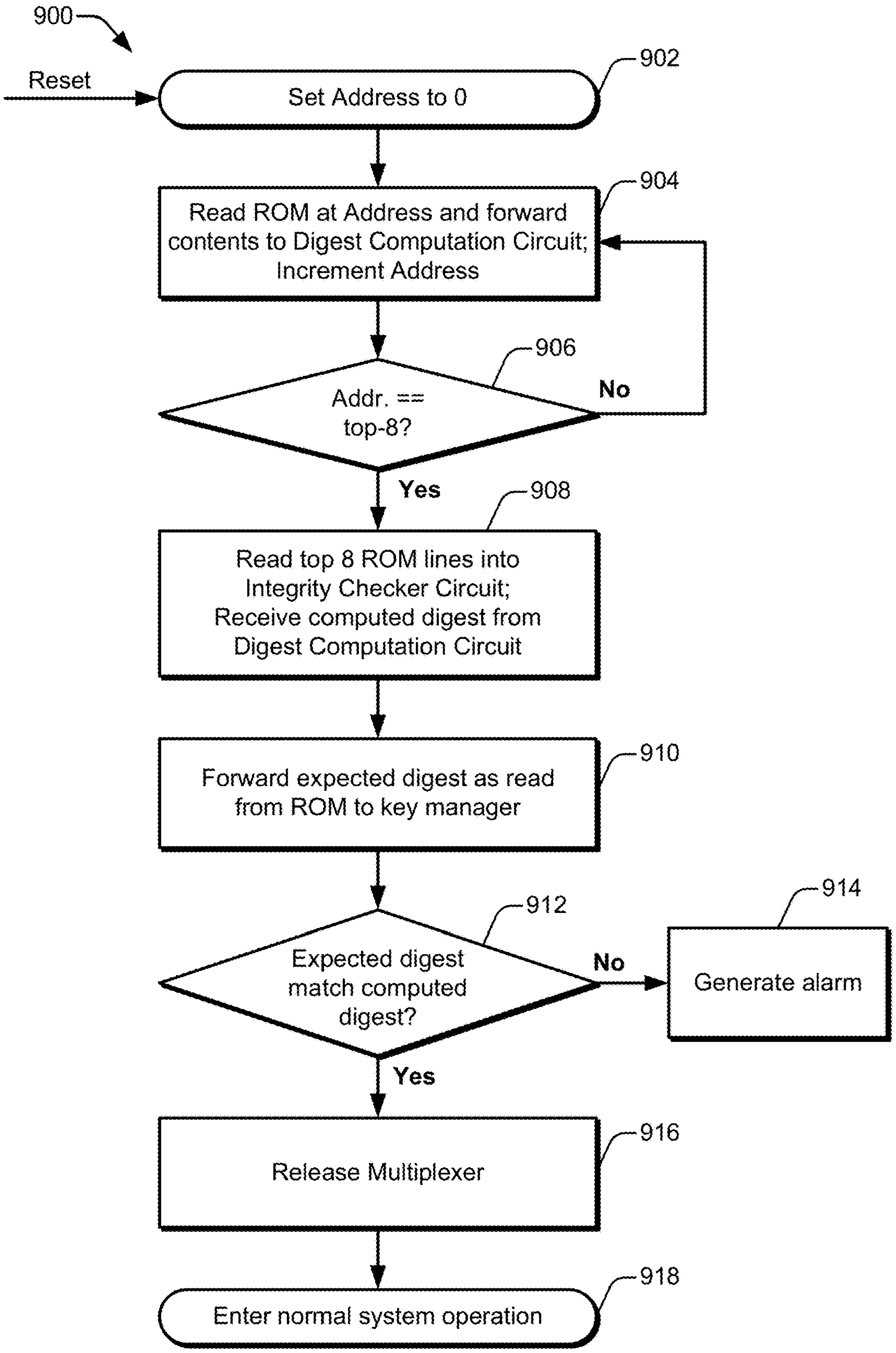
FIG. 9 illustrates example methods for an apparatus to check the integrity of the ROM, such as at startup or reset.

Example methods are described below with reference to the flow diagrams of FIGS. 9 through 13. FIG. 9 illustrates, with the flow diagram 900, example methods for an apparatus to check the integrity of the ROM, such as at startup or reset. The flow diagram 900 includes nine blocks 902-918. With reference also to FIG. 6, the ROM integrity checker circuit 502 can run after reset, including "immediately" after reset, or at least before any reads to the ROM are conducted. Until the ROM checking is completed, the ROM checker can control ROM address requests (e.g., through the multiplexer 602). The select signal 632 for the multiplexer 602 can include a redundant encoding to protect the selection signal 632 against fault injection (FI) attacks. If the select signal 632 has an invalid value, detection of the invalidity can trigger a fatal alert. Before starting to read data from the ROM array 404, the ROM checker (or a power manager module) can start cryptographic operations to prepare for performing one or more hashing operations for the ROM checking.

At 902, the ROM checker can read the ROM contents in unscrambled address order starting with "address 0," which results in a scattered access pattern on the physical ROM because of the address scrambling. At 904, each ROM read produces 39 bits of data, which are padded with zeros (e.g., by the zero padder circuit 618) to reach 64 bits. This 64-bit length matches the interface expected by the digest computation circuit 508 of FIG. 5 (e.g., a KMAC engine (not explicitly shown in FIG. 5 or 6)). The address is incremented.

The ROM integrity checker circuit 502 loops through many of the words in the ROM (e.g., from bottom to top). The reading and incrementing until the address reaches a predetermined address as described below for block 906. A finite state machine (FSM) of the integrity checker circuit 502 passes each ROM word to the KMAC engine using a ready/valid interface and setting the "kmac_rom_last_o" bit responsive to the last word being sent.

At 906, a decision is made based on an address value. Some quantity of words may be reserved for an expected hash value. For example, the top eight (top-8) words in the ROM array 404 (e.g., by unscrambled address) can be interpreted as a 256-bit "expected hash value." Unlike the remainder of the ROM array 404, the data of the words for the expected hash may be stored in an unscrambled condition. Thus, the expected hash value can be read directly without decryption. At 908, these top 8 words are read from the ROM array 404 into a buffer or register for the expected digest value. Thus, these words can be obtained by the integrity checker circuit 502 (e.g., ignoring ECC bits) as the expected hash. The expected hash can be compared with the digest that is received back from the KMAC engine or other implementation of the digest computation circuit 508.

At 910, once the digest is received from the KMAC engine, the integrity checker circuit 502 can forward the digest to a key checker, such as a key manager. The key manager, or the integrity checker circuit 502, can compare at 912 the computed digest with the expected digest that was read from the top eight words of the ROM array 404. The forwarding of block 910 may be omitted if the FSM of the ROM controller 402 performs the comparison. If the two digests do not match, the key manager and/or the integrity checker circuit 502 can generate an alarm at 914. The alarm can be signaled as an alert or an interrupt. Responsive to a match of the expected and computed digests, at 916, the integrity checker circuit 502 can signal a "check_good_o" indication as "On" and can release the multiplexer 602. By doing so, the integrity checker circuit 502 switches over access to the multiplexer 602 to allow other components to access the ROM array 404 via the interface 604. With a match or a nonmatch, a "check_done_o" indication may be asserted (e.g., driven high) when the computation and/or comparison is completed. The system may then enter normal operation at 918.

Figure 10:
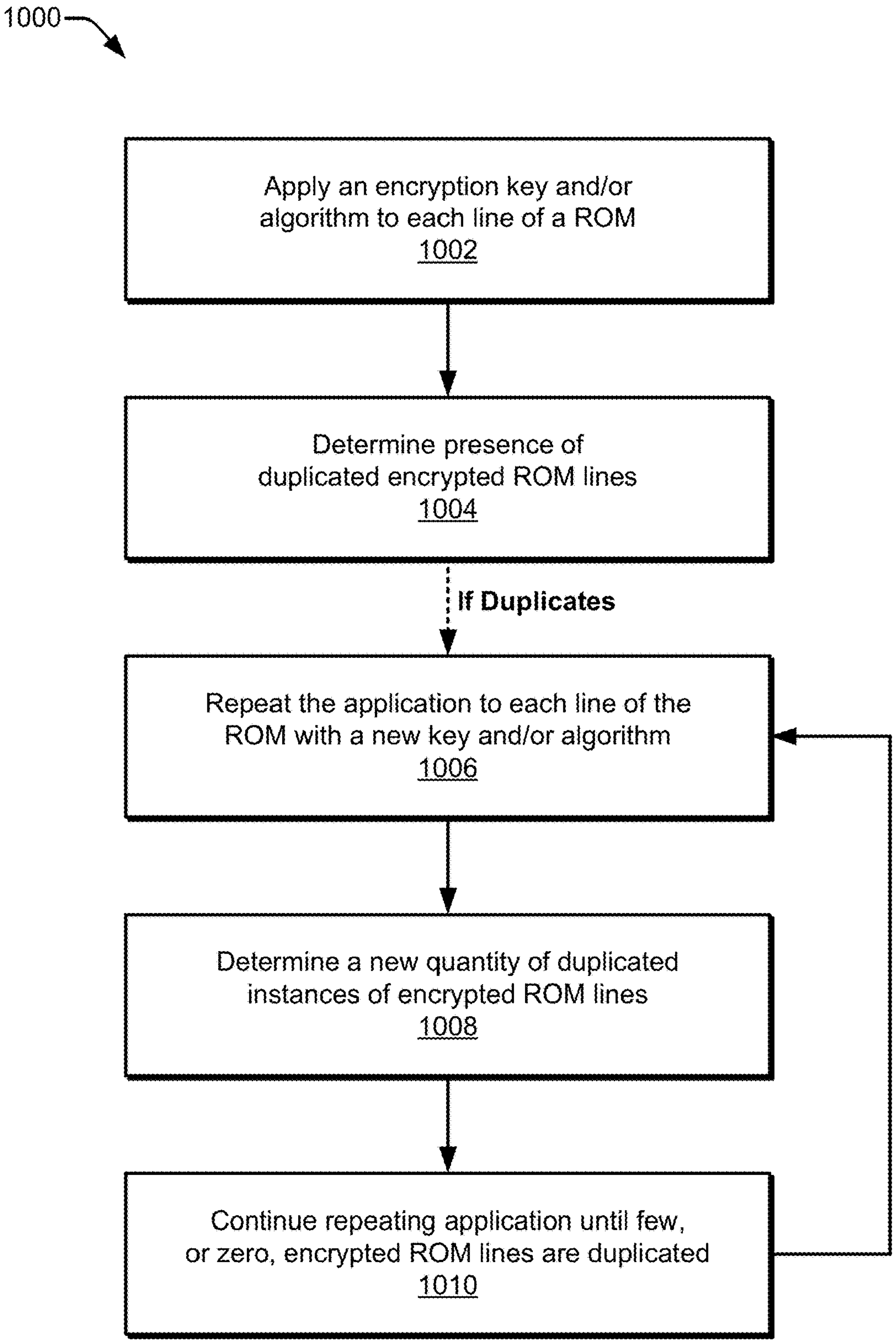
FIG. 10 illustrates example methods in accordance with a resilient ROM integrity checking procedure.

FIG. 10 illustrates a flow diagram or process 1000 for example methods in accordance with integrity check with resiliency. Generally, with respect to example encryption-key-based implementations, the flow diagram 1000 can entail selecting an encryption key first. Second, each line of the ROM data is encrypted to produce a respective encrypted ROM datum 412 using the selected encryption key. Third, the multiple instances of encrypted ROM datum 412 are checked to determine if any duplicates are present. If there are no duplicates, the process can terminate. On the other hand, if at least one duplicate is detected, the process can continue by repeating steps, starting with selecting another encryption key.

As shown in FIG. 10, the flow diagram 1000 includes five blocks 1002-1010. At block 1002, an encryption key and/or an encryption algorithm is applied to each line of a ROM to produce multiple encrypted ROM lines. At block 1004, the presence of a quantity of duplicated encrypted ROM lines is determined. If the quantity is zero (or meets another threshold), the process may terminate as indicated by the dashed line arrow: On the other hand, if the quantity of duplicates is nonzero, the application of the encryption is repeated at block 1006 to each line of the ROM with a new encryption key and/or a new encryption algorithm. At block 1008, a new quantity of duplicated instances of encrypted ROM lines is determined based on the new key and/or new algorithm. As per block 1010, the process can be continued at block 1006 until some threshold quantity, such as zero, of the encrypted ROM lines are duplicated by application of a given key and algorithm combination.

Figure 11:
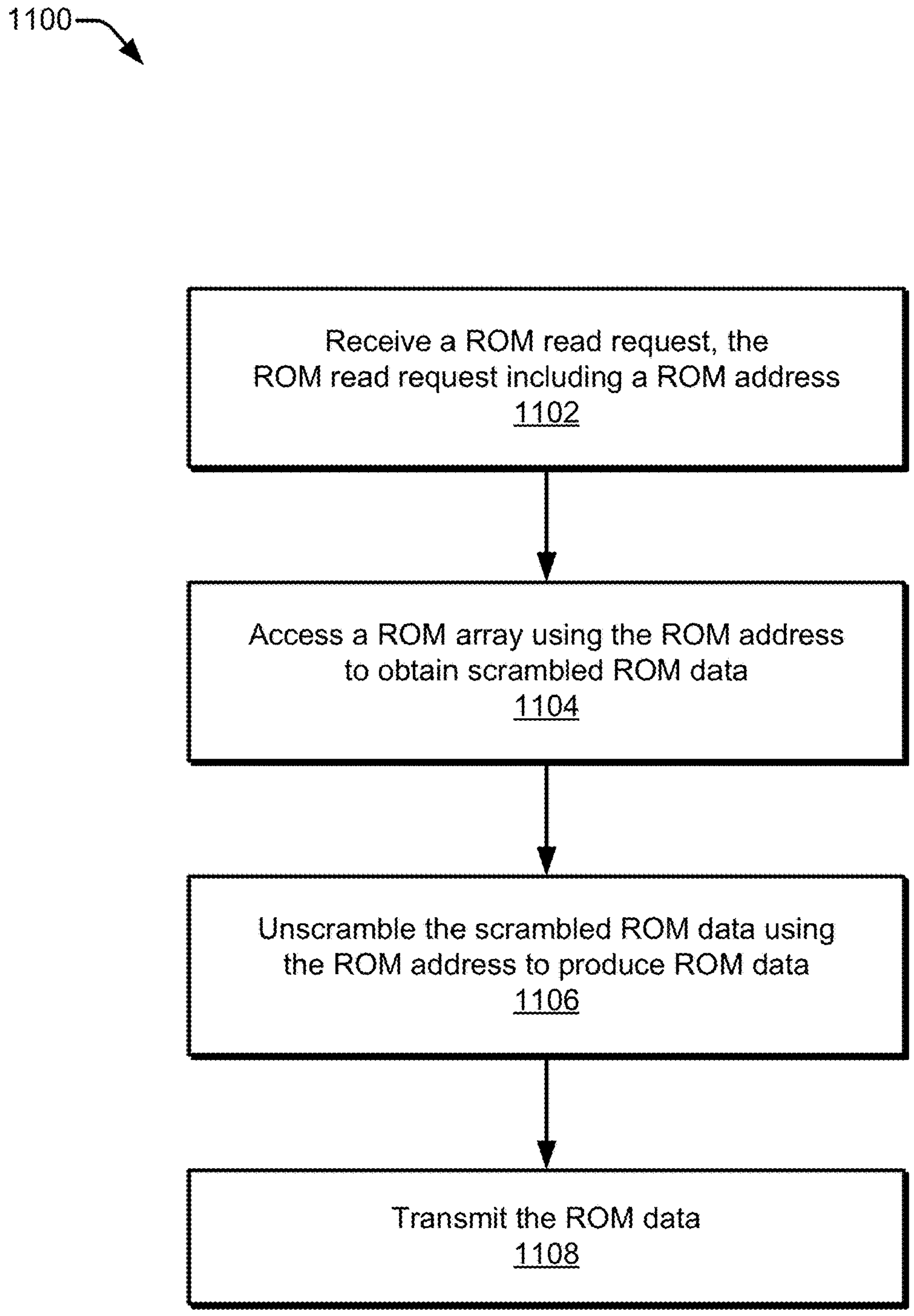
FIG. 11 illustrates example methods for an apparatus to implement ROM encryption, such as for accessing encrypted ROM data through decryption.

FIG. 11 illustrates at a flow diagram or process 1100 example methods for an apparatus to implement ROM scrambling, such as for accessing scrambled ROM data. The flow diagram 1100 includes four blocks 1102-1108. The operations may be performed by a ROM block, such as a ROM 118/206 peripheral device. At block 1102, the ROM can receive a ROM read request, with the ROM read request including a ROM address, from a system bus or an interface thereof. At block 1104, a ROM controller of the ROM can access a ROM array using the ROM address to obtain scrambled ROM data, which may include ECC or other protection data in addition to a ROM instruction. More generally, the scrambled ROM data may be implemented as encrypted ROM data.

At block 1106, cryptographic circuitry of the ROM controller can unscramble the scrambled ROM data using the ROM address to produce ROM data, which is unscrambled. For example, the cryptographic circuitry can use one or more of keystream circuitry 608, manipulation circuitry 612 (e.g., a substitution and permutation network or other circuit to diffuse the bits of the scrambled ROM data), and a data combination circuit 614 that performs a logical operation. At block 1108, the ROM controller can transmit the unscrambled ROM data to another peripheral device via an interface and/or a system bus.

Figure 12:
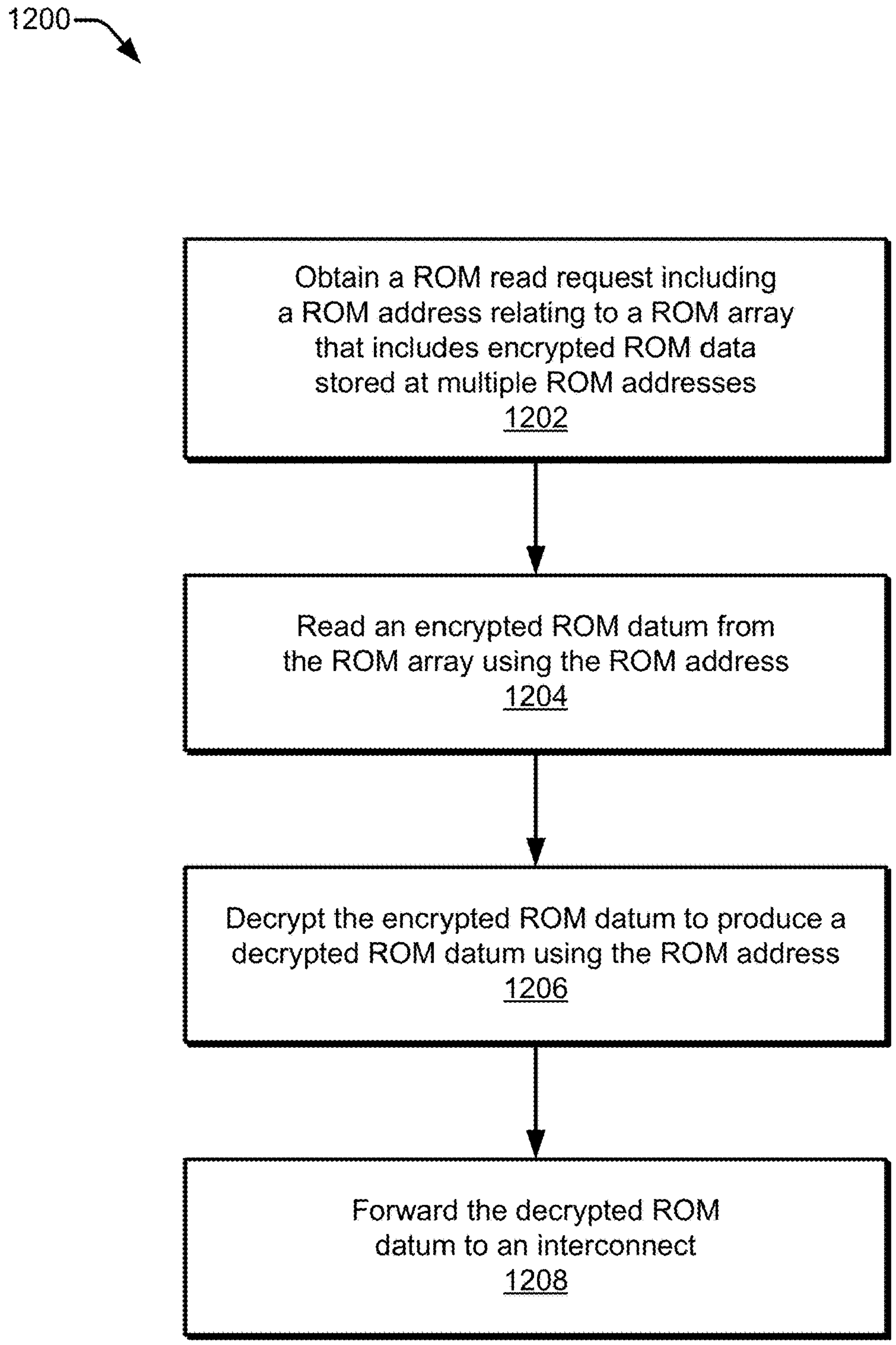
FIG. 12 is a flow diagram illustrating an example process for accessing a ROM array that includes encrypted ROM data.

FIG. 12 is a flow diagram illustrating an example process 1200 for accessing a ROM array that includes encrypted ROM data. The flow diagram includes four blocks 1202-1208. At block 1202, a ROM read request is obtained, with the ROM read request including a ROM address relating to a ROM array that includes encrypted ROM data stored at multiple ROM addresses. For example, a ROM controller 402 can obtain a ROM read request including a ROM address 414 relating to a ROM array 404 that includes encrypted ROM data 410 stored at multiple ROM addresses 418. The ROM read request may be obtained, for instance, from another component via an interconnect 110 and/or an interface 604.

At block 1204, an encrypted ROM datum is read from the ROM array using the ROM address. For example, the ROM controller 402 can read an encrypted ROM datum 412 from the ROM array 404 using the ROM address 414. In some cases, the ROM controller 402 may include an address adjustment circuit 504, and the address adjustment circuit 504 may adjust the ROM address 512 to produce an adjusted ROM address 514. In such cases, the ROM controller 402 may obtain the encrypted ROM datum 412 from the ROM array 404 using the ROM address 414 that is realized with the adjusted ROM address 514.

At block 1206, the encrypted ROM datum is decrypted to produce a decrypted ROM datum using the ROM address. For example, cryptographic circuitry 408 can decrypt the encrypted ROM datum 412 to produce a decrypted ROM datum 416 using the ROM address 414. To do so, the cryptographic circuitry 408 may use the ROM address 414 to generate a key that is used as part of a decryption algorithm to produce the decrypted ROM datum 416.

At block 1208, the decrypted ROM datum is forwarded to an interconnect. For example, the ROM controller 402 can forward the decrypted ROM datum 416 to the interconnect 110. Here, the decrypted ROM datum 416 may include check code bits. Additionally or alternatively, a ROM checker circuit 616 may perform an error-checking procedure at the ROM as part of, or in conjunction with, the act of forwarding the decrypted ROM datum 416.

Figure 13:
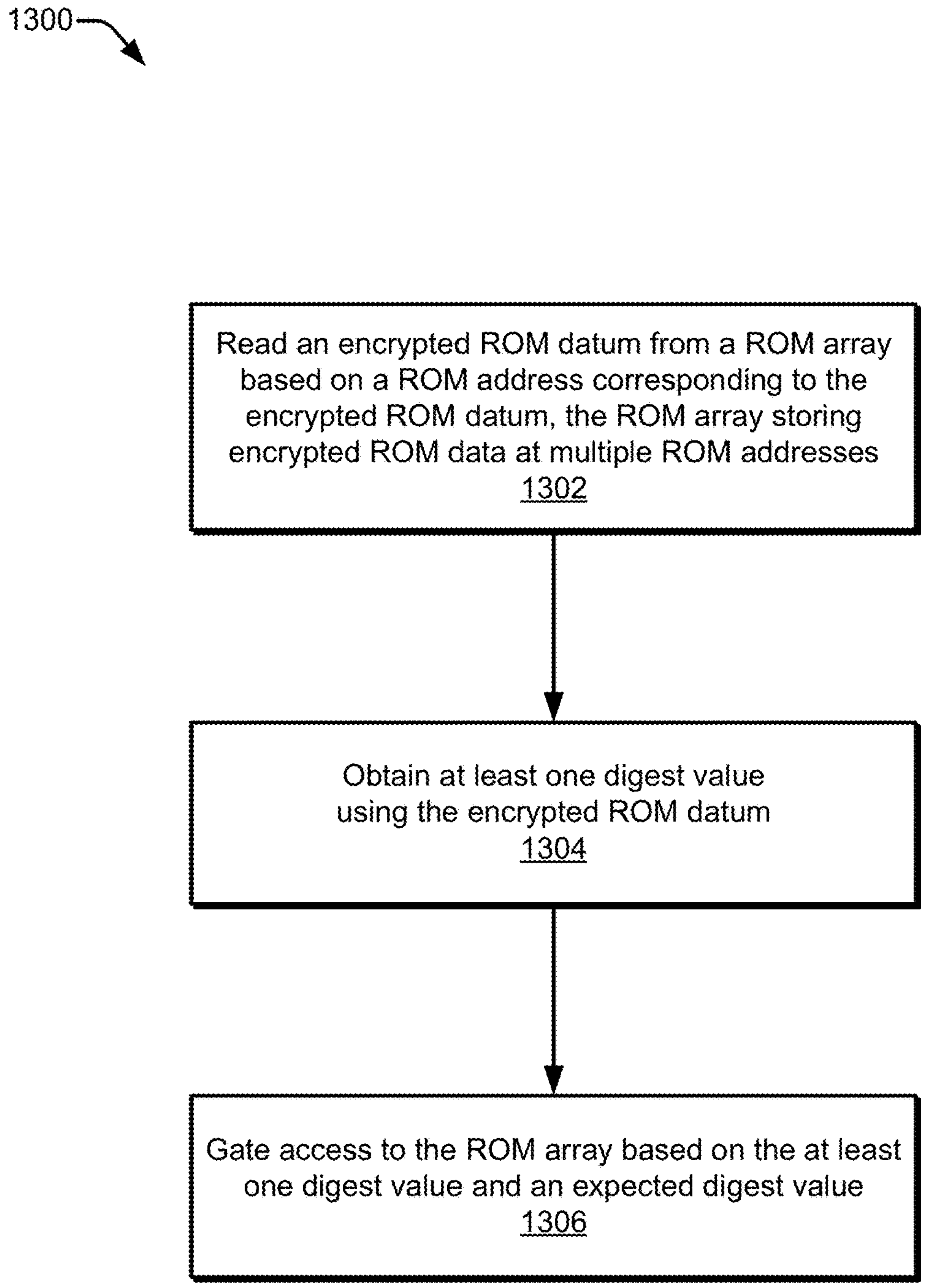
FIG. 13 is a flow diagram illustrating an example process for checking the integrity of a ROM array that includes encrypted ROM data.

FIG. 13 is a flow diagram illustrating an example process 1300 for checking the integrity of a ROM array that includes encrypted ROM data. The flow diagram includes three blocks 1302-1306. At block 1302, an encrypted ROM datum is read from a ROM array based on a ROM address corresponding to the encrypted ROM datum, with the ROM array storing encrypted ROM data at multiple ROM addresses. For example, a ROM controller 402 can read an encrypted ROM datum 412 from a ROM array 404 based on a ROM address 512 or 514 corresponding to the encrypted ROM datum 412. Thus, the ROM controller 402 may include an address adjustment circuit 504 that produces an adjusted ROM address 514 from a ROM address 512 such that the adjusted ROM address 514 is used to identify the encrypted ROM datum 412 that is being retrieved. Here, the ROM array 404 can store encrypted ROM data 410 at multiple ROM addresses 418. The ROM array 404 may also store an expected digest value 510.

At block 1304, at least one digest value is obtained using the encrypted ROM datum. For example, the ROM controller 402 can obtain at least one digest value 516 using the encrypted ROM datum 412. In some cases, an integrity checker circuit 502 of the ROM controller 402 may communicate with a digest computation circuit 508, that is external to the ROM 118, to obtain the at least one digest value 516. In other cases, the integrity checker circuit 502 or another part of the ROM 118 may include circuitry to compute a hash for the digest value 516. The digest value 516 may correspond to a hash over multiple instances of encrypted ROM datum 412, including up to all instances of the encrypted ROM datum 412 in a given ROM array 404. In such cases, for block 1302, multiple ones of the encrypted ROM datum 412 are read from the ROM array 404 based on multiple ROM addresses corresponding to the multiple ones of the encrypted ROM datum 412. Further, for block 1304, the hashing algorithm is applied to the multiple ones of the encrypted ROM datum 412 as read from the ROM array 404.

At block 1306, access to the ROM array is gated based on the at least one digest value and an expected digest value. For example, the ROM controller 402 can gate access to the ROM array 404 based on the at least one digest value 516 and an expected digest value 510. To do so, the integrity checker circuit 502 may compare the digest value 516 to the expected digest value 510. If there is not a match, gate circuitry 506 may block or deny access to the ROM array 404. If the two values 510 and 516 do match, on the other hand, the gate circuitry 506 can permit access to the ROM array 404 to other components, e.g., to enable initialization to proceed or a "regular" ROM access to occur.

Aspects of these methods may be implemented in, for example, hardware (e.g., fixed logic circuitry or a processor in conjunction with a memory), firmware, software, or some combination thereof. The methods may be realized using one or more of the apparatuses or components shown in FIGS. 1 to 8 and 14, which components may be further divided, combined, and so on. The devices and components of these figures generally represent hardware, such as electronic devices, PCBs, packaged modules, IC chips, components, or circuits: firmware: software; or a combination thereof. Thus, these figures illustrate some of the many possible systems or apparatuses capable of implementing the described methods.

For the methods described herein and the associated flow diagram(s), the orders in which operations are shown and/or described are not intended to be construed as a limitation. Instead, any number or combination of the described method operations can be combined in any order to implement a given method or an alternative method. Operations may also be omitted from or added to the described methods. Further, described operations can be implemented in fully or partially overlapping manners.

Example Aspects and Implementations for ROM Security

In the following, some example aspects and implementations are described:

Example aspect 1: An apparatus for secure read-only memory, ROM, the apparatus comprising: a ROM array including encrypted ROM data stored at multiple ROM addresses: and a ROM controller coupled to the ROM array, the ROM controller including: cryptographic circuitry configured to perform a decryption operation on the encrypted ROM data based on the multiple ROM addresses: and a ROM access interface coupled to the cryptographic circuitry and the ROM array, the ROM access interface configured to: read an encrypted ROM datum from the ROM array based on a ROM address corresponding to the encrypted ROM datum: decrypt the encrypted ROM datum to produce a decrypted ROM datum using the cryptographic circuitry: and forward the decrypted ROM datum to an interconnect.

Example aspect 2: The apparatus of example aspect 1, wherein the ROM access interface is configured to decrypt the encrypted ROM datum to produce the decrypted ROM datum using the ROM address corresponding to the encrypted ROM datum.

Example aspect 3: The apparatus of example aspect 1 or example aspect 2, wherein the cryptographic circuitry is configured to perform the decryption operation on a respective ROM datum of the encrypted ROM data based on a respective ROM address of the multiple ROM addresses, the respective ROM address configured to identify the respective ROM datum in the ROM array.

Example aspect 4: The apparatus of any one of the preceding example aspects, wherein the ROM access interface comprises a finite state machine, FSM, configured to provide access to the encrypted ROM data as decrypted ROM data for a bootup procedure. A FSM is a system which at any time takes a corresponding one of a plurality of predefined states, and the system transitions from one state to another based on inputs to the FSM.

Example aspect 5: The apparatus of any one of the preceding example aspects, wherein: the ROM controller comprises an address adjustment circuit configured to adjust ROM addresses to produce adjusted ROM addresses: and the ROM access interface is configured to adjust the ROM addresses to read the encrypted ROM data stored at the multiple ROM addresses using the address adjustment circuit.

Example aspect 6: The apparatus of example aspect 5, wherein the address adjustment circuit is configured to at least one of permute or substitute two or more bits of each ROM address of the ROM addresses to produce the adjusted ROM addresses.

Example aspect 7: The apparatus of any one of the preceding example aspects, wherein the cryptographic circuitry comprises: keystream circuitry configured to produce keys based on ROM addresses: and data combination circuitry coupled to the keystream circuitry, the data combination circuitry configured to produce the decrypted ROM datum based on the encrypted ROM datum and at least one key of the keys.

Example aspect 8: The apparatus of example aspect 7, wherein: the cryptographic circuitry comprises a manipulation circuit configured to diffuse two or more bits of the encrypted ROM datum to produce a manipulated encrypted ROM datum; and the data combination circuitry is configured to combine bits of the at least one key and bits of the manipulated encrypted ROM datum using a logical operation to produce the decrypted ROM datum.

Example aspect 9: The apparatus of any one of the preceding example aspects, wherein the encrypted ROM datum includes bits corresponding to a ROM instruction and bits corresponding to a check code for the ROM instruction: and the decrypted ROM datum includes bits corresponding to the ROM instruction and bits corresponding to the check code for the ROM instruction.

Example aspect 10: The apparatus of example aspect 9, wherein the ROM controller comprises: a ROM checker circuit coupled to an output of the cryptographic circuitry, the ROM checker circuit configured to: compute another check code based on the ROM instruction of the decrypted ROM datum: perform a comparison including the check code of the decrypted ROM datum and the computed check code: and generate an error signal based on the comparison (e.g., if there is no match between the check code and the computed check code).

Example aspect 11: The apparatus of example aspect 9, wherein each encrypted ROM datum of the encrypted ROM data stored at the multiple ROM addresses of the ROM array is distinct from each other encrypted ROM datum of the encrypted ROM data stored at the multiple ROM addresses of the ROM array due to an encryption scheme that is based on the multiple ROM addresses.

Example aspect 12: The apparatus of any one of the preceding example aspects, wherein the apparatus comprises a mobile device.

Example aspect 13: A method for secure read-only memory, ROM, the method comprising: obtaining a ROM read request including a ROM address relating to a ROM array that includes encrypted ROM data stored at multiple ROM addresses: reading an encrypted ROM datum from the ROM array using the ROM address: decrypting the encrypted ROM datum to produce a decrypted ROM datum using the ROM address: and forwarding the decrypted ROM datum to an interconnect.

Example aspect 14: The method of example aspect 13, wherein the decrypting comprises: generating at least one key based on the ROM address: and applying the at least one key to the encrypted ROM datum to produce the decrypted ROM datum.

Example aspect 15: The method of example aspect 14, wherein the applying comprises: performing a logical operation that includes the at least one key and the encrypted ROM datum to produce the decrypted ROM datum.

Example aspect 16: The method of example aspect 15, wherein the decrypting comprises: manipulating, prior to the performing of the logical operation, bits of the encrypted ROM datum to produce a manipulated ROM datum, wherein the performing includes performing the logical operation using the at least one key and the manipulated ROM datum to produce the decrypted ROM datum.

Example aspect 17: An integrated circuit including security circuitry for secure read-only memory, ROM, the security circuitry comprising: a ROM array including ROM data at multiple ROM addresses: and a ROM controller coupled to the ROM array, the ROM controller configured to cryptographically tie a respective ROM address of the multiple ROM addresses to a respective ROM datum of the ROM data.

Example aspect 18: The integrated circuit of example aspect 17, wherein the ROM controller comprises cryptographic circuitry configured to decrypt the respective ROM datum using the respective ROM address.

Example aspect 19: The integrated circuit of example aspect 18, wherein the cryptographic circuitry is configured to: generate at least one key based on the respective ROM address: and decrypt the respective ROM datum using the at least one key to produce a decrypted ROM datum.

Example aspect 20: The integrated circuit of example aspect 19, wherein the cryptographic circuitry is configured to: produce the decrypted ROM datum using the at least one key by applying the at least one key to a version of the respective ROM datum, the version corresponding to a manipulated version of the respective ROM datum that is stored in the ROM array.

Example aspect 21: The integrated circuit of any one of example aspects 17 to 20, wherein the ROM controller is configured to: operate on a combination of ROM bits and error correction code, ECC, bits that jointly form the respective ROM datum corresponding to the respective ROM address.

Example aspect 22: The integrated circuit of any one of example aspects 17 to 21, wherein the ROM controller comprises: an integrity checker circuit coupled to the ROM array, the integrity checker circuit configured to gate access to the ROM array based on a checking procedure applied to the ROM data and an expected digest (e.g., to grant access to the ROM array (that is, service requests to read data from the ROM array) if, and only if, a match is obtained by the checking procedure).

Example aspect 23: The integrated circuit of example aspect 22, wherein the integrity checker circuit is configured to implement the checking procedure by: extracting the expected digest from the ROM array: performing a comparison including the extracted expected digest and a digest computed based on the ROM data of the ROM array: and granting or denying access to the ROM array based on the comparison (e.g., granting if there is match between the extracted expected digest and the digest computed based on the ROM data of the ROM array but denying otherwise).

Example aspect 24: An apparatus for secure read-only memory, ROM, the apparatus comprising: a ROM array including encrypted ROM data stored at multiple ROM addresses: and a ROM controller coupled to the ROM array, the ROM controller configured to: read an encrypted ROM datum from the ROM array based on a ROM address corresponding to the encrypted ROM datum: obtain at least one digest value using the encrypted ROM datum; and gate access to the ROM array based on the at least one digest value and an expected digest value (e.g., to grant access to the ROM array if, any only if, a match is obtained between the at least one digest value and the expected digest value but block or deny otherwise).

Example aspect 25: The apparatus of example aspect 24, wherein: the ROM controller comprises an address adjustment circuit configured to adjust ROM addresses to produce adjusted ROM addresses: and the ROM controller is configured to adjust the ROM addresses to obtain the adjusted ROM addresses, and, using the adjusted ROM addresses, read the encrypted ROM data stored at the multiple ROM addresses using the address adjustment circuit.

Example aspect 26: The apparatus of example aspect 24 or example aspect 25, wherein: the ROM controller is configured to obtain the at least one digest value based on causing at least one hashing algorithm to be applied to the encrypted ROM datum.

Example aspect 27: The apparatus of example aspect 26, wherein: the ROM array and the ROM controller comprise a first peripheral device: a second peripheral device is configured to implement one or more hashing algorithms: and the ROM controller is configured to obtain the at least one digest value by communicating with the second peripheral device.

Example aspect 28: The apparatus of any one of example aspects 24 to 27, wherein: the ROM controller is configured to read the expected digest value from the ROM array.

Example aspect 29: The apparatus of example aspect 28, wherein the expected digest value is stored in the ROM array in an unencrypted form.

Example aspect 30: The apparatus of example aspect 28, wherein the expected digest value is stored in the ROM array at a predetermined location corresponding to a determinable ROM address.

Example aspect 31: The apparatus of any one of example aspects 24 to 30, wherein: responsive to the at least one digest value matching the expected digest value, the ROM controller is configured to grant access to the ROM array to permit a boot procedure to be performed using the encrypted ROM data.

Example aspect 32: The apparatus of any one of example aspects 24 to 31, wherein: responsive to the at least one digest value failing to match the expected digest value, the ROM controller is configured to: block access to the ROM array to prevent a boot procedure from being performed using the encrypted ROM data: and transmit an alarm indication.

Example aspect 33: The apparatus of any one of example aspects 24 to 32, wherein: each respective encrypted ROM datum of the encrypted ROM data is different from each other respective encrypted ROM datum of the encrypted ROM data throughout the ROM array.

Example aspect 34: The apparatus of example aspect 33, wherein a cryptographic key related to production of the encrypted ROM data is selected to ensure that each respective encrypted ROM datum is different from each other respective encrypted ROM datum for the encrypted ROM data throughout the ROM array. For example, one or more cryptographic keys may be used in an iterative process which is performed to reduce the number of ROM data which are the same (e.g., to be zero, or at least below a threshold).

Example aspect 35: The apparatus of example aspect 33, wherein a cryptographic algorithm related to production of the encrypted ROM data is selected to ensure that each respective encrypted ROM datum is different from each other respective encrypted ROM datum for the encrypted ROM data throughout the ROM array. For example, one or more cryptographic algorithms may be used in an iterative process which is performed to reduce the number of ROM data which are the same (e.g., to be zero, or at least below a threshold).

Example aspect 36: A method for secure read-only memory, ROM, the method comprising: reading an encrypted ROM datum from a ROM array based on a ROM address corresponding to the encrypted ROM datum, the ROM array storing encrypted ROM data at multiple ROM addresses: obtaining at least one digest value using the encrypted ROM datum; and gating access to the ROM array based on the at least one digest value and an expected digest value.

Example aspect 37: The method of example aspect 36, wherein the reading comprises: adjusting the ROM address to produce an adjusted ROM address: and reading the encrypted ROM datum from the ROM array using the adjusted ROM address.

Example aspect 38: The method of example aspect 36 or example aspect 37, wherein the gating comprises: blocking access to the ROM array responsive to the at least one digest value failing to match the expected digest value.

Example aspect 39: An integrated circuit including security circuitry with read-only memory, ROM, the security circuitry comprising: a ROM array including multiple encrypted ROM lines, each encrypted ROM line of the multiple encrypted ROM lines being distinct from each other encrypted ROM line of the multiple encrypted ROM lines: and a ROM controller coupled to the ROM array and configured to control access to the ROM array responsive to at least one digest value that is produced based on the multiple encrypted ROM lines.

Example aspect 40: The integrated circuit of example aspect 39, further comprising: a digest computation circuit configured to compute the at least one digest value based on the multiple encrypted ROM lines.

Example aspect 41: The integrated circuit of example aspect 40, wherein the digest computation circuit is part of a ROM block that includes the ROM array and the ROM controller.

Example aspect 42: The integrated circuit of any one of example aspects 39 to 41, wherein a cryptographic key is selected to ensure that the multiple encrypted ROM lines are nonduplicative. For example, at least one cryptographic key (whether pre-defined or obtained in any way) may be used in an iterative process which is performed to reduce the number of duplicative encrypted ROM lines (e.g., to zero, or at least below a threshold).

Example aspect 43: The integrated circuit of any one of example aspects 39 to 42, wherein a cryptographic algorithm is selected to ensure that the multiple encrypted ROM lines are nonduplicative. For example, at least one cryptographic algorithm (whether pre-defined or obtained in any way) may be used in an iterative process which is performed to reduce the number of duplicative encrypted ROM lines (e.g., to zero, or at least below a threshold).

Example aspect 44: A method for integrity check with resiliency of a read-only memory, ROM, the method comprising: applying an encryption algorithm and an encryption key to multiple lines for a ROM to produce a first set of multiple encrypted ROM lines; determining a quantity of encrypted ROM lines of the multiple encrypted ROM lines that are duplicative: and based on the quantity, changing at least one of the encryption algorithm or the encryption key, and applying the at least one changed encryption algorithm or encryption key to the multiple lines for the ROM to produce a second set of multiple encrypted ROM lines.

Example aspect 45: The method of example aspect 44, further comprising: repeating the changing, the applying of the at least one changed encryption algorithm or encryption key, and the determining until the quantity is zero.

Example aspect 46: The apparatus of any one of example aspects 24 to 35, wherein the ROM controller is configured to provide the at least one digest value to a component that is external of the ROM.

Example Electronic Devices for ROM Security

Figure 14:
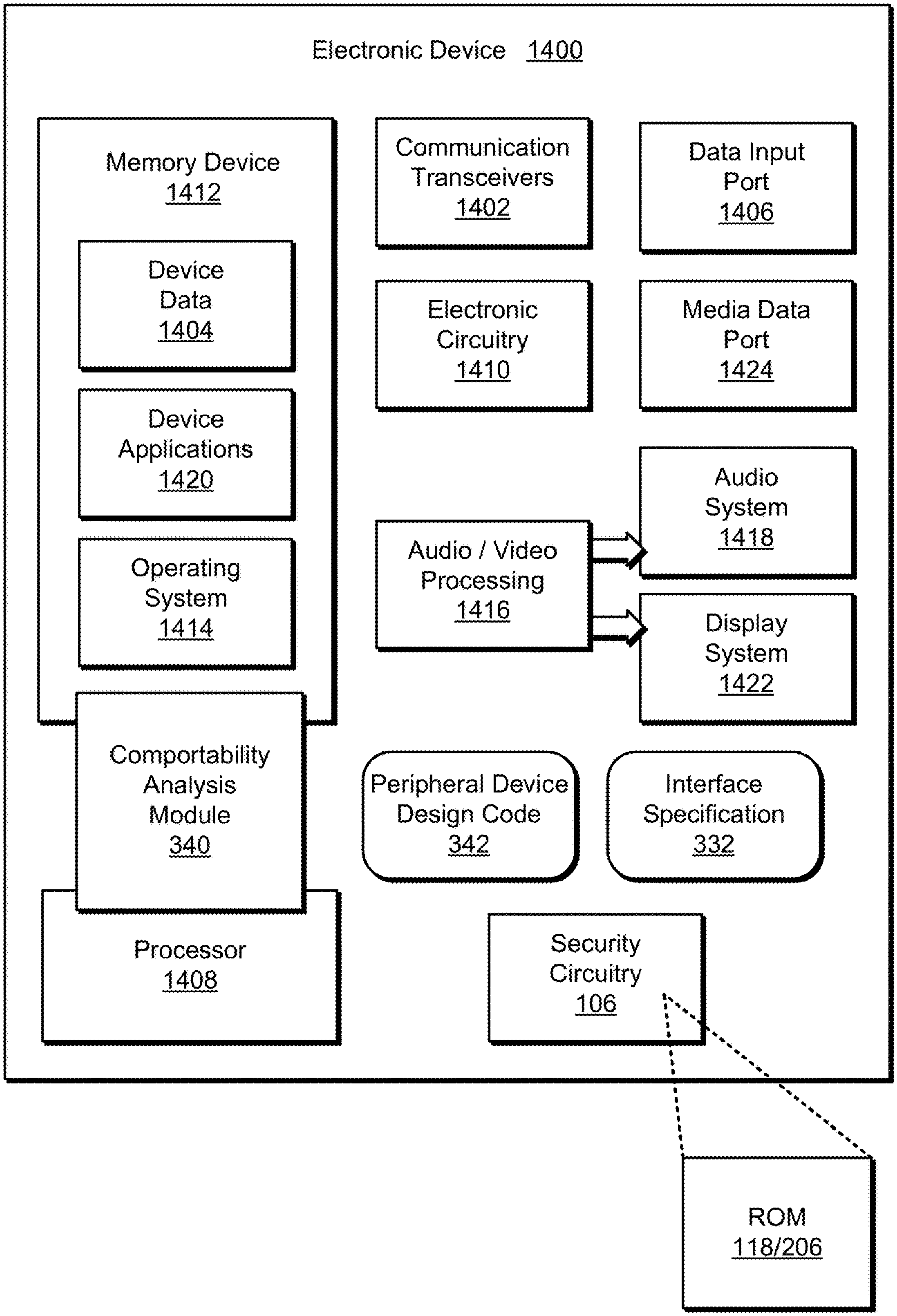
FIG. 14 illustrates various components of an example electronic device that can implement ROM security in accordance with one or more described aspects.

FIG. 14 illustrates various components of an example electronic device 1400 that can implement ROM security in accordance with one or more described aspects. The electronic device 1400 may be implemented as any one or combination of a fixed, mobile, stand-alone, or embedded device: in any form of a consumer, computer, portable, user, server, communication, phone, navigation, gaming, audio, camera, messaging, media playback, and/or other type of electronic device 1400, such as the smartphone that is depicted in FIG. 1 as the apparatus 102. One or more of the illustrated components may be realized as discrete components or as integrated components on at least one integrated circuit of the electronic device 1400.

The electronic device 1400 can include one or more communication transceivers 1402 that enable wired and/or wireless communication of device data 1404, such as received data, transmitted data, or other information identified above. Example communication transceivers 1402 include near-field communication (NFC) transceivers, wireless personal area network (PAN) (WPAN) radios compliant with various IEEE 802.15 (Bluetooth™) standards, wireless local area network (LAN) (WLAN) radios compliant with any of the various IEEE 802.11 (Wi-Fi™) standards, wireless wide area network (WAN) (WWAN) radios (e.g., those that are 3GPP-compliant) for cellular telephony, wireless metropolitan area network (MAN) (WMAN) radios compliant with various IEEE 802.16 (WiMAX™) standards, infrared (IR) transceivers compliant with an Infrared Data Association (IrDA) protocol, and wired local area network (LAN) (WLAN) Ethernet transceivers.

The electronic device 1400 may also include one or more data input ports 1406 via which any type of data, media content, and/or other inputs can be received, such as user-selectable inputs, messages, applications, music, television content, recorded video content, and any other type of audio, video, and/or image data received from any content and/or data source, including a sensor like a microphone or a camera. The data input ports 1406 may include USB ports, coaxial cable ports, fiber optic ports for optical fiber interconnects or cabling, and other serial or parallel connectors (including internal connectors) for flash memory, DVDs, CDs, and the like. These data input ports 1406 may be used to couple the electronic device to components, peripherals, or accessories such as keyboards, microphones, cameras, or other sensors.

The electronic device 1400 of this example includes at least one processor 1408 (e.g., any one or more of application processors, microprocessors, digital-signal processors (DSPs), controllers, and the like), which can include a combined processor and memory system (e.g., implemented as part of an SoC), that processes (e.g., executes) computer-executable instructions to control operation of the device. The processor 1408 may be implemented as an application processor, embedded controller, microcontroller, security processor, artificial intelligence (AI) accelerator, and the like. Generally, a processor or processing system may be implemented at least partially in hardware, which can include components of an integrated circuit or on-chip system, a digital-signal processor (DSP), an application-specific integrated circuit (ASIC), a field-programmable gate array (FPGA), a complex programmable logic device (CPLD), and other implementations in silicon and/or other materials.

Alternatively or additionally, the electronic device 1400 can be implemented with any one or combination of electronic circuitry, which may include software, hardware, firmware, or fixed logic circuitry that is implemented in connection with processing and control circuits, which are generally indicated at 1410 (as electronic circuitry 1410). This electronic circuitry 1410 can implement executable or hardware-based modules (not shown in FIG. 14), such as through processing/computer-executable instructions stored on computer-readable media, through logic circuitry and/or hardware (e.g., such as an FPGA), and so forth.

Although not shown, the electronic device 1400 can include a system bus, interconnect, crossbar, data transfer system, or other switch fabric that couples the various components within the device. A system bus or interconnect can include any one or a combination of different bus structures, such as a memory bus or memory controller, a peripheral bus, a universal serial bus, and/or a processor or local bus that utilizes any of a variety of bus architectures.

The electronic device 1400 also includes one or more memory devices 1412 that enable data storage, examples of which include random access memory (RAM), non-volatile memory (e.g., read-only memory (ROM), flash memory, EPROM, and EEPROM), and a disk storage device. Thus, the memory device(s) 1412 can be distributed across different logical storage levels of a system as well as at different physical components. The memory device(s) 1412 provide data storage mechanisms to store the device data 1404, other types of code and/or data, and various device applications 1420 (e.g., software applications or programs). For example, an operating system 1414 can be maintained as software instructions within the memory device 1412 and executed by the processor 1408.

In some implementations, the electronic device 1400 also includes an audio and/or video processing system 1416 that processes audio data and/or passes through the audio and video data to an audio system 1418 and/or to a display system 1422 (e.g., a video buffer or a screen of a smartphone or camera). The audio system 1418 and/or the display system 1422 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, video bus, or other similar communication link, such as a media data port 1424. In some implementations, the audio system 1418 and/or the display system 1422 are external or separate components of the electronic device 1400. Alternatively, the display system 1422, for example, can be an integrated component of the example electronic device 1400, such as part of an integrated touch interface.

The electronic device 1400 of FIG. 14 is an example implementation of the apparatus 102 of FIG. 1, an example implementation of a device that can implement the analysis 344 of FIG. 4, and an example implementation of a device that can implement any of the methods of FIGS. 9 to 13. The electronic device 1400 can thus include security circuitry 106, which can be a separate IC chip or included as part of another IC chip or device, like the processor 1408, the electronic circuitry 1410, or the memory device 1412. Accordingly, one or more of the illustrated components may be integrated on the same IC chip, like an SoC, or at least on a single PCB.

As shown, the electronic device 1400 may additionally or alternatively include a comportability analysis module 340. For instance, the memory device 1412 may store the comportability analysis module 340, and the processor 1408 may execute the comportability analysis module 340. Accordingly, the memory device 1412 may also store peripheral device design code 342, an interface specification 332, and so forth. The electronic device 1400 may also or instead implement the iterative process of FIG. 10. Moreover, the ROM 118/206 can include any of the components of FIGS. 4 to 6—e.g., as part of security circuitry 106. Further, the ROM 118/206 can be implemented in any of the components of the electronic device 1400 that are described above, as part of or separate from security circuitry 106. The principles of ROM security as described herein can therefore be implemented by, or in conjunction with, the electronic device 1400 of FIG. 14.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for ROM security have been described in language specific to certain features and/or methods, the subject of the appended claims is not necessarily limited to the specific features or methods described. Rather, the specific features and methods are disclosed as example implementations for ROM security.

What is claimed is:

1. An apparatus for secure read-only memory (ROM), the apparatus comprising:
- a ROM array including encrypted ROM data stored at multiple ROM addresses; and
- a ROM controller coupled to the ROM array, the ROM controller including:
  - cryptographic circuitry configured to perform a decryption operation on the encrypted ROM data based on the multiple ROM addresses at which the encrypted ROM data is stored; and
  - a ROM access interface coupled to the cryptographic circuitry and the ROM array, the ROM access interface configured to:
    - read an encrypted ROM datum from the ROM array based on a ROM address corresponding to the encrypted ROM datum;
    - after reading the encrypted ROM datum, decrypt the encrypted ROM datum to produce a decrypted ROM datum using the cryptographic circuitry that performs the decryption operation based on the ROM address corresponding to the encrypted ROM datum; and
    - forward the decrypted ROM datum to an interconnect, the cryptographic circuitry comprising:
  - keystream circuitry configured to produce multiple keys respectively based on the multiple ROM addresses, the multiple keys including at least one key that is produced based on the ROM address corresponding to the encrypted ROM datum; and
  - data combination circuitry coupled to the keystream circuitry, the data combination circuitry configured to produce the decrypted ROM datum based on the encrypted ROM datum and the at least one key.

2. The apparatus of claim 1, wherein the ROM access interface is configured to use the cryptographic circuitry to cryptographically tie the ROM address to the decrypted ROM datum.

3. The apparatus of claim 1, wherein the cryptographic circuitry is configured to perform the decryption operation on a respective ROM datum of the encrypted ROM data based on a respective ROM address of the multiple ROM addresses, the respective ROM address configured to identify the respective ROM datum in the ROM array.

4. The apparatus of claim 1, wherein the ROM access interface comprises a finite state machine (FSM) configured to provide access to the encrypted ROM data as decrypted ROM data for a bootup procedure.

5. The apparatus of claim 1, wherein:
- the ROM controller comprises an address adjustment circuit configured to adjust ROM addresses to produce adjusted ROM addresses; and
- the ROM access interface is configured to adjust the ROM addresses to read the encrypted ROM data stored at the multiple ROM addresses using the address adjustment circuit.

6. The apparatus of claim 5, wherein the address adjustment circuit is configured to at least one of permute or substitute two or more bits of each ROM address of the ROM addresses to produce the adjusted ROM addresses.

7. The apparatus of claim 1, wherein:
- the cryptographic circuitry comprises a manipulation circuit configured to manipulate at least one bit of the encrypted ROM datum to produce a manipulated encrypted ROM datum; and
- the data combination circuitry is configured to produce the decrypted ROM datum based on the manipulated encrypted ROM datum and at least one key of the multiple keys.

8. The apparatus of claim 7, wherein:
- the manipulation circuit is configured to diffuse two or more bits of the encrypted ROM datum to produce the manipulated encrypted ROM datum; and
- the data combination circuitry is configured to combine bits of the at least one key and bits of the manipulated encrypted ROM datum using at least one logical operation to produce the decrypted ROM datum.

9. The apparatus of claim 1, wherein:
- the encrypted ROM datum includes bits corresponding to a ROM instruction and bits corresponding to a check code for the ROM instruction; and
- the decrypted ROM datum includes bits corresponding to the ROM instruction and bits corresponding to the check code for the ROM instruction.

10. The apparatus of claim 9, wherein the ROM controller comprises:
- a ROM checker circuit coupled to an output of the cryptographic circuitry, the ROM checker circuit configured to:
  - compute another check code based on the ROM instruction of the decrypted ROM datum;
  - perform a comparison including the check code of the decrypted ROM datum and the computed other check code; and
  - generate an error signal based on the comparison.

11. The apparatus of claim 9, wherein each encrypted ROM datum of the encrypted ROM data stored at the multiple ROM addresses of the ROM array is distinct from each other encrypted ROM datum of the encrypted ROM data stored at the multiple ROM addresses of the ROM array due to an encryption scheme that is based on the multiple ROM addresses.

12. The apparatus of claim 1, wherein the apparatus comprises a mobile device.

13. A method for secure read-only memory (ROM), the method comprising:
- obtaining a ROM read request including a ROM address relating to a ROM array that includes encrypted ROM data stored at multiple ROM addresses;
- generating at least one key based on the ROM address;
- reading an encrypted ROM datum from the ROM array using the ROM address corresponding to the encrypted ROM datum;

after the reading of the encrypted ROM datum, decrypting the encrypted ROM datum to produce a decrypted ROM datum using the encrypted ROM datum and the at least one key; and forwarding the decrypted ROM datum to an interconnect, wherein:

the decrypting comprises performing at least one logical operation that includes the at least one key and the encrypted ROM datum to produce the decrypted ROM datum;

the decrypting comprises manipulating, prior to the performing of the at least one logical operation, bits of the encrypted ROM datum to produce a manipulated encrypted ROM datum;

the performing includes performing the at least one logical operation using the at least one key and the manipulated encrypted ROM datum to produce the decrypted ROM datum;

the manipulating comprises diffusing two or more bits of the encrypted ROM datum to produce the manipulated encrypted ROM datum; and the performing comprises combining bits of the at least one key and bits of the manipulated encrypted ROM datum using the at least one logical operation to produce the decrypted ROM datum.

* * * * *